(12) United States Patent
Hung et al.

(10) Patent No.: US 11,386,058 B2
(45) Date of Patent: Jul. 12, 2022

(54) RULE-BASED AUTONOMOUS DATABASE CLOUD SERVICE FRAMEWORK

(71) Applicant: Oracle International Corporation, Redwood Shores, CA (US)

(72) Inventors: Hochak Hung, Foster City, CA (US); Kumar Rajamani, San Ramon, CA (US); Jaebock Lee, Sunnyvale, CA (US); Sanket Jain, Sunnyvale, CA (US); Giridhar Ravipati, Foster City, CA (US); John McHugh, Santa Cruz, CA (US); Churn Don Lee, San Francisco, CA (US); Alexander Chen, Millbrae, CA (US); Jen-Cheng Huang, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/135,769

(22) Filed: Sep. 19, 2018

(65) Prior Publication Data
US 2019/0102411 A1  Apr. 4, 2019

Related U.S. Application Data

(60) Provisional application No. 62/566,156, filed on Sep. 29, 2017.

(51) Int. Cl.
*G06F 16/21* (2019.01)
*G06F 16/25* (2019.01)
(Continued)

(52) U.S. Cl.
CPC ............ *G06F 16/217* (2019.01); *G06F 16/21* (2019.01); *G06F 16/25* (2019.01); *G06F 16/273* (2019.01);
(Continued)

(58) Field of Classification Search
CPC ............ H04L 41/0856; H04L 67/2809; H04L 41/5003; H04L 67/26; G06N 5/025;
(Continued)

(56) References Cited

U.S. PATENT DOCUMENTS

| 4,769,772 A | 9/1988 | Dwyer |
| 4,803,614 A | 2/1989 | Banba et al. |

(Continued)

FOREIGN PATENT DOCUMENTS

| CN | 104951425 A | * | 9/2015 |
| CN | 104951425 B | | 9/2015 |

OTHER PUBLICATIONS

Yam, U.S. Appl. No. 15/266,030, filed Sep. 15, 2016, Final Office Action, dated Sep. 3, 2019.
(Continued)

*Primary Examiner* — Umar Cheema
*Assistant Examiner* — John Fan
(74) *Attorney, Agent, or Firm* — Hickman Becker Bingham Ledesma LLP; Brian N. Miller

(57) ABSTRACT

Provided herein are data cloud administration techniques that achieve autonomy by using a rules engine that reacts to a database system event by autonomously submitting an asynchronous job to reconfigure a database. In an embodiment, a rules engine receives an event from a DBMS. Based on the event, the rules engine executes a rule to generate a request that indicates configuration details for a database. The rules engine sends the request to a request broker. The request broker dispatches an asynchronous job based on the request. The asynchronous job configures the database based on the configuration details. Thus, databases in a cloud, data grid, or data center may be administered autonomously (without human intervention) base on dynamic conditions that are foreseen and unforeseen.

48 Claims, 11 Drawing Sheets

(51) Int. Cl.
*G06F 16/27* (2019.01)
*G06N 5/02* (2006.01)
*H04L 12/24* (2006.01)
*G06N 20/00* (2019.01)
*H04L 29/08* (2006.01)
*H04L 41/085* (2022.01)
*H04L 41/5003* (2022.01)
*H04L 67/562* (2022.01)
*H04L 67/55* (2022.01)
*H04L 41/0853* (2022.01)

(52) U.S. Cl.
CPC ............. *G06N 5/025* (2013.01); *G06N 20/00* (2019.01); *H04L 41/0856* (2013.01); *H04L 41/5003* (2013.01); *H04L 67/2809* (2013.01); *H04L 67/26* (2013.01)

(58) Field of Classification Search
CPC ..... G06N 20/00; G06F 16/273; G06F 16/217; G06F 16/25; G06F 16/21
USPC ........................................................ 709/201
See application file for complete search history.

(56) References Cited

U.S. PATENT DOCUMENTS

| | | |
|---|---|---|
| 4,829,427 A | 5/1989 | Green |
| 4,956,774 A | 9/1990 | Shibamiya et al. |
| 5,091,852 A | 2/1992 | Tsuchida et al. |
| 5,251,131 A | 10/1993 | Masand et al. |
| 5,287,459 A | 2/1994 | Gniewek |
| 5,301,317 A | 4/1994 | Lohman et al. |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |
| 5,412,804 A | 5/1995 | Krishna |
| 5,412,806 A | 5/1995 | Du et al. |
| 5,444,820 A | 8/1995 | Tzes et al. |
| 5,452,468 A | 9/1995 | Peterson |
| 5,459,837 A | 10/1995 | Caccavale |
| 5,469,560 A | 11/1995 | Beglin |
| 5,495,419 A | 2/1996 | Rostoker et al. |
| 5,495,606 A | 2/1996 | Borden et al. |
| 5,504,894 A | 4/1996 | Fegurson et al. |
| 5,537,588 A | 7/1996 | Engelmann et al. |
| 5,551,027 A | 8/1996 | Choy et al. |
| 5,572,640 A | 11/1996 | Schettler |
| 5,574,900 A | 11/1996 | Huang et al. |
| 5,590,319 A | 12/1996 | Cohen et al. |
| 5,642,515 A | 6/1997 | Jones et al. |
| 5,671,403 A | 9/1997 | Shekita et al. |
| 5,675,791 A | 10/1997 | Bhide et al. |
| 5,680,547 A | 10/1997 | Chang |
| 5,694,591 A | 12/1997 | Du et al. |
| 5,710,915 A | 1/1998 | McElhiney |
| 5,761,654 A | 6/1998 | Tow |
| 5,764,912 A | 6/1998 | Rosborough |
| 5,765,150 A | 6/1998 | Burrows |
| 5,787,251 A | 7/1998 | Hamilton et al. |
| 5,794,227 A | 8/1998 | Brown |
| 5,797,136 A | 8/1998 | Boyer et al. |
| 5,822,748 A | 10/1998 | Cohen et al. |
| 5,852,820 A | 12/1998 | Burrows |
| 5,857,180 A | 1/1999 | Hallmark et al. |
| 5,860,069 A | 1/1999 | Wright |
| 5,875,445 A | 2/1999 | Antonshenkov |
| 5,918,225 A | 6/1999 | White et al. |
| 6,002,669 A | 12/1999 | White |
| 6,003,022 A | 12/1999 | Eberhard et al. |
| 6,009,265 A | 12/1999 | Huang et al. |
| 6,026,390 A | 2/2000 | Ross et al. |
| 6,026,391 A | 2/2000 | Osborn et al. |
| 6,026,394 A | 2/2000 | Tsuchida et al. |
| 6,061,676 A | 5/2000 | Srivastava et al. |
| 6,185,699 B1 | 2/2001 | Haderle |
| 6,205,449 B1 | 3/2001 | Rastogi |
| 6,205,451 B1 | 3/2001 | Norcott et al. |
| 6,226,650 B1 | 5/2001 | Mahajan |
| 6,289,335 B1 | 9/2001 | Downing et al. |
| 6,295,610 B1 | 9/2001 | Ganesh |
| 6,298,342 B1 | 10/2001 | Graefe et al. |
| 6,334,128 B1 | 12/2001 | Norcott et al. |
| 6,339,768 B1 | 1/2002 | Leung et al. |
| 6,353,826 B1 | 3/2002 | Seputis |
| 6,356,889 B1 | 3/2002 | Lohman et al. |
| 6,356,891 B1 | 3/2002 | Agrawal et al. |
| 6,370,524 B1 | 4/2002 | Witkowski |
| 6,430,550 B1 | 8/2002 | Leo et al. |
| 6,438,558 B1 | 8/2002 | Stegelmann |
| 6,438,562 B1 | 8/2002 | Gupta et al. |
| 6,526,526 B1 | 2/2003 | Dong et al. |
| 6,529,896 B1 | 3/2003 | Leung et al. |
| 6,529,901 B1 | 3/2003 | Chaudhuri et al. |
| 6,598,038 B1 | 7/2003 | Guay et al. |
| 6,615,222 B2 | 9/2003 | Hornibrook et al. |
| 6,684,203 B1 | 1/2004 | Waddington et al. |
| 6,694,306 B1 | 2/2004 | Nishizawa et al. |
| 6,807,546 B2 | 10/2004 | Young-Lai |
| 6,901,405 B1 | 5/2005 | McCrady et al. |
| 6,934,699 B1 | 8/2005 | Haas et al. |
| 6,941,360 B1 | 9/2005 | Srivastava et al. |
| 6,954,776 B1 | 10/2005 | Cruanes et al. |
| 6,961,729 B1 | 11/2005 | Toohey et al. |
| 6,980,988 B1 | 12/2005 | Demers et al. |
| 6,983,295 B1 | 1/2006 | Hart |
| 6,990,503 B1 | 1/2006 | Luo et al. |
| 7,007,007 B2 | 2/2006 | Slutz |
| 7,089,225 B2 | 8/2006 | Li et al. |
| 7,139,749 B2 | 11/2006 | Bossman et al. |
| 7,155,428 B1 | 12/2006 | Brown et al. |
| 7,155,459 B2 | 12/2006 | Chaudhuri et al. |
| 7,185,000 B1 | 2/2007 | Brown et al. |
| 7,194,452 B2 | 3/2007 | Galindo-Legaria et al. |
| 7,246,108 B2 | 7/2007 | Ahmed |
| 7,272,600 B1 | 9/2007 | Singh et al. |
| 7,305,410 B2 | 12/2007 | Skopec et al. |
| 7,305,421 B2 | 12/2007 | Cha |
| 7,337,169 B2 | 2/2008 | Galindo-Legaria et al. |
| 7,346,635 B2 | 3/2008 | Whitten et al. |
| 7,366,713 B2* | 4/2008 | Kaluskar ............... G06F 40/137 707/769 |
| 7,383,247 B2 | 6/2008 | Li et al. |
| 7,406,477 B2 | 7/2008 | Farrar et al. |
| 7,406,515 B1* | 7/2008 | Joyce .................. H04M 3/5175 379/265.01 |
| 7,499,907 B2 | 3/2009 | Brown et al. |
| 7,526,508 B2 | 4/2009 | Tan et al. |
| 7,634,477 B2* | 12/2009 | Hinshaw ............... G06F 16/273 |
| 7,647,293 B2 | 1/2010 | Brown et al. |
| 7,664,730 B2 | 2/2010 | Ziauddin et al. |
| 7,747,606 B2 | 6/2010 | Dageville et al. |
| 7,805,411 B2 | 9/2010 | Ziauddin et al. |
| 7,822,717 B2 | 10/2010 | Kapoor |
| 7,890,491 B1 | 2/2011 | Simmen |
| 7,966,313 B2 | 6/2011 | Bruno et al. |
| 7,970,755 B2 | 6/2011 | Belknap et al. |
| 8,019,750 B2 | 9/2011 | Kosciusko et al. |
| 8,117,174 B2 | 2/2012 | Shaughessey |
| 8,180,762 B2 | 5/2012 | Steinbach et al. |
| 8,335,767 B2 | 12/2012 | Das et al. |
| 8,364,648 B1 | 1/2013 | Sim-Tang |
| 8,386,450 B2 | 2/2013 | Simmen |
| 8,478,718 B1 | 7/2013 | Ranade |
| 8,554,762 B1 | 10/2013 | O'Neill |
| 8,600,977 B2 | 12/2013 | Dageville et al. |
| 8,805,849 B1 | 8/2014 | Christensen |
| 9,026,679 B1 | 5/2015 | Shmuylovich |
| 9,189,522 B2 | 11/2015 | Das et al. |
| 9,280,591 B1 | 3/2016 | Kharatishvili |
| 9,390,120 B1 | 7/2016 | Gulliver |
| 9,507,843 B1 | 11/2016 | Madhavarapu |
| 9,684,561 B1 | 6/2017 | Yan |

(56) References Cited

U.S. PATENT DOCUMENTS

| | | |
|---|---|---|
| 9,817,836 B2 | 11/2017 | Zha |
| 9,940,203 B1 | 4/2018 | Ghatnekar |
| 10,063,651 B2 | 8/2018 | Carter |
| 10,348,565 B2 | 7/2019 | Kannan et al. |
| 10,374,809 B1 | 8/2019 | Dasaarakothapalli et al. |
| 10,484,297 B1 | 11/2019 | McClenahan |
| 10,521,747 B2 | 12/2019 | Warner |
| 2001/0047372 A1 | 11/2001 | Gorelik et al. |
| 2002/0038313 A1 | 3/2002 | Klein et al. |
| 2002/0099521 A1 | 7/2002 | Yang et al. |
| 2002/0112022 A1 | 8/2002 | Kazar et al. |
| 2002/0138376 A1 | 9/2002 | Hinkle |
| 2002/0143733 A1 | 10/2002 | Mukkamalla |
| 2002/0188600 A1 | 12/2002 | Lindsay et al. |
| 2003/0033291 A1 | 2/2003 | Harris |
| 2003/0065644 A1 | 4/2003 | Horman et al. |
| 2003/0088541 A1 | 5/2003 | Zilio et al. |
| 2003/0093408 A1 | 5/2003 | Brown et al. |
| 2003/0115212 A1 | 6/2003 | Hornibrook et al. |
| 2003/0135480 A1 | 7/2003 | Van Arsdale et al. |
| 2003/0154236 A1* | 8/2003 | Dar ............ H04L 67/1002 709/201 |
| 2003/0159136 A1 | 8/2003 | Huang et al. |
| 2003/0182276 A1 | 9/2003 | Bossman et al. |
| 2003/0212647 A1 | 11/2003 | Bangel et al. |
| 2003/0212668 A1 | 11/2003 | Hinshaw et al. |
| 2003/0229639 A1 | 12/2003 | Carlson et al. |
| 2004/0002996 A1 | 1/2004 | Bischof |
| 2004/0003004 A1 | 1/2004 | Chaudhuri et al. |
| 2004/0015600 A1 | 1/2004 | Tiwary et al. |
| 2004/0024888 A1* | 2/2004 | Davis ............ G06Q 30/02 709/229 |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0181521 A1 | 9/2004 | Simmen |
| 2004/0186826 A1* | 9/2004 | Choi ............ G06F 16/24553 |
| 2004/0205062 A1 | 10/2004 | Brown et al. |
| 2004/0210577 A1 | 10/2004 | Kundu |
| 2004/0220911 A1 | 11/2004 | Zuzarte et al. |
| 2004/0244031 A1 | 12/2004 | Martinez |
| 2005/0028134 A1 | 2/2005 | Zane et al. |
| 2005/0038831 A1 | 2/2005 | Souder et al. |
| 2005/0055382 A1 | 3/2005 | Ferrat et al. |
| 2005/0086195 A1 | 4/2005 | Tan et al. |
| 2005/0120000 A1 | 6/2005 | Ziauddin et al. |
| 2005/0125393 A1 | 6/2005 | Yagoub et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0165741 A1 | 7/2005 | Gordon |
| 2005/0177557 A1 | 8/2005 | Ziauddin et al. |
| 2005/0177971 A1 | 8/2005 | Porco |
| 2005/0187971 A1 | 8/2005 | Hassan et al. |
| 2005/0198013 A1 | 8/2005 | Cunningham et al. |
| 2005/0203933 A1 | 9/2005 | Chaudhuri et al. |
| 2005/0203940 A1 | 9/2005 | Farrar et al. |
| 2005/0234965 A1 | 10/2005 | Rozenshtein et al. |
| 2005/0262060 A1 | 11/2005 | Rohwedder et al. |
| 2005/0278357 A1 | 12/2005 | Brown et al. |
| 2005/0278577 A1 | 12/2005 | Doong et al. |
| 2005/0283458 A1 | 12/2005 | Galindo-Legaria et al. |
| 2005/0283471 A1 | 12/2005 | Rafi |
| 2005/0283478 A1 | 12/2005 | Choi |
| 2006/0026115 A1 | 2/2006 | Ahmed |
| 2006/0026133 A1 | 2/2006 | Ahmed |
| 2006/0031200 A1 | 2/2006 | Santosuosso |
| 2006/0036989 A1 | 2/2006 | Chaudhuri et al. |
| 2006/0041537 A1 | 2/2006 | Rafi |
| 2006/0047626 A1 | 3/2006 | Raheem |
| 2006/0047713 A1 | 3/2006 | Gornshtein |
| 2006/0085378 A1 | 4/2006 | Raizman et al. |
| 2006/0085484 A1 | 4/2006 | Raizman et al. |
| 2006/0101224 A1 | 5/2006 | Shah et al. |
| 2006/0107141 A1 | 5/2006 | Hekmatpour |
| 2006/0129542 A1 | 6/2006 | Hinshaw et al. |
| 2006/0179042 A1* | 8/2006 | Bram ............ G06N 5/043 |
| 2006/0179116 A1 | 8/2006 | Speeter |
| 2006/0195416 A1 | 8/2006 | Ewen et al. |
| 2006/0212428 A1 | 9/2006 | Nelson |
| 2006/0218123 A1 | 9/2006 | Chowdhuri et al. |
| 2007/0038618 A1 | 2/2007 | Kosciusko et al. |
| 2007/0061379 A1 | 3/2007 | Wong et al. |
| 2007/0078825 A1 | 4/2007 | Bornhoevd et al. |
| 2007/0083500 A1 | 4/2007 | Zibitsker |
| 2007/0083563 A1 | 4/2007 | Souder |
| 2007/0100912 A1 | 5/2007 | Pareek |
| 2007/0136383 A1 | 6/2007 | Steinbach et al. |
| 2007/0214104 A1 | 9/2007 | Miao et al. |
| 2007/0244918 A1 | 10/2007 | Lee |
| 2008/0010240 A1 | 1/2008 | Zait |
| 2008/0016123 A1 | 1/2008 | Devraj et al. |
| 2008/0040196 A1 | 2/2008 | Coon et al. |
| 2008/0052271 A1 | 2/2008 | Lam |
| 2008/0077348 A1 | 3/2008 | Hildebrand et al. |
| 2008/0098003 A1 | 4/2008 | Dias et al. |
| 2008/0114718 A1 | 5/2008 | Anderson et al. |
| 2008/0126393 A1 | 5/2008 | Bossman et al. |
| 2008/0162491 A1 | 7/2008 | Becker |
| 2008/0168058 A1 | 7/2008 | Gordon |
| 2008/0178079 A1 | 7/2008 | Chen et al. |
| 2008/0208820 A1 | 8/2008 | Usey |
| 2008/0215536 A1 | 9/2008 | Day et al. |
| 2008/0228710 A1 | 9/2008 | Muras |
| 2008/0235183 A1 | 9/2008 | Draese et al. |
| 2009/0006445 A1 | 1/2009 | Shemenzon et al. |
| 2009/0018992 A1 | 1/2009 | Zuzarte et al. |
| 2009/0037923 A1 | 2/2009 | Smith et al. |
| 2009/0077017 A1 | 3/2009 | Belknap et al. |
| 2009/0282203 A1 | 11/2009 | Haustein |
| 2009/0327214 A1 | 12/2009 | Richardson et al. |
| 2009/0327254 A1 | 12/2009 | Bruno et al. |
| 2010/0005340 A1 | 1/2010 | Belknap et al. |
| 2011/0060724 A1 | 3/2011 | Chan |
| 2011/0087633 A1 | 4/2011 | Kreuder et al. |
| 2011/0126197 A1 | 5/2011 | Larsen et al. |
| 2011/0307450 A1 | 12/2011 | Hahn |
| 2012/0173717 A1 | 7/2012 | Kohli |
| 2012/0180070 A1 | 7/2012 | Pafumi et al. |
| 2012/0284228 A1 | 11/2012 | Ghosh |
| 2012/0284544 A1 | 11/2012 | Xian |
| 2012/0287282 A1 | 11/2012 | Lu |
| 2012/0323849 A1 | 12/2012 | Garin |
| 2013/0085742 A1 | 4/2013 | Barker et al. |
| 2013/0117237 A1 | 5/2013 | Thomsen et al. |
| 2013/0132349 A1 | 5/2013 | Hahn |
| 2013/0166504 A1 | 6/2013 | Varkhedi et al. |
| 2013/0198133 A1 | 8/2013 | Lee |
| 2013/0198211 A1 | 8/2013 | Kohkaki |
| 2013/0290506 A1 | 10/2013 | Astete |
| 2014/0019387 A1 | 1/2014 | Cao et al. |
| 2014/0095452 A1 | 4/2014 | Lee |
| 2014/0095530 A1 | 4/2014 | Lee |
| 2014/0164331 A1 | 6/2014 | Li |
| 2014/0188804 A1 | 7/2014 | Gokhale |
| 2014/0258241 A1 | 9/2014 | Chen |
| 2015/0032694 A1 | 1/2015 | Rajamani et al. |
| 2015/0120659 A1 | 4/2015 | Srivastava |
| 2015/0254240 A1 | 9/2015 | Li et al. |
| 2016/0014038 A1* | 1/2016 | Thyagarajan ......... G06F 9/5077 709/226 |
| 2016/0036623 A1 | 2/2016 | Clarkson |
| 2016/0092288 A1 | 3/2016 | Rawat et al. |
| 2016/0094406 A1 | 3/2016 | Phan |
| 2016/0188621 A1 | 6/2016 | Karinta et al. |
| 2016/0352836 A1 | 12/2016 | Kamalakantha |
| 2017/0048314 A1 | 2/2017 | Aerdts |
| 2017/0116207 A1 | 4/2017 | Lee |
| 2017/0116213 A1 | 4/2017 | Jain |
| 2017/0116235 A1 | 4/2017 | Yam |
| 2017/0116249 A1 | 4/2017 | Ravipati |
| 2017/0116298 A1 | 4/2017 | Ravipati |
| 2017/0315877 A1 | 11/2017 | Kaplingat |

(56) References Cited

U.S. PATENT DOCUMENTS

| | | |
|---|---|---|
| 2017/0316085 A1 | 11/2017 | Gupta |
| 2017/0357550 A1 | 12/2017 | Jain |
| 2018/0060181 A1 | 3/2018 | Rajamani |
| 2018/0075044 A1 | 3/2018 | Kruglikov |
| 2018/0075086 A1 | 3/2018 | Yam |
| 2018/0096252 A1* | 4/2018 | Fagundes ............... G06N 20/00 |
| 2018/0137139 A1 | 5/2018 | Bangalore |
| 2019/0102384 A1 | 4/2019 | Hung et al. |
| 2021/0056123 A1 | 2/2021 | Lee |

OTHER PUBLICATIONS

Sartain, JD, "Max Productivity", dated Feb. 17, 2015, 8 pages.
Sartain, JD, "5 Must-know Excel Macros for Common Tasks", dated Sep. 10, 2014, 12 pages.
Yam, U.S. Appl. No. 15/266,917, filed Sep. 15, 2016, Advisory Action, dated Apr. 29, 2019.
Yam, U.S. Appl. No. 15/266,030, filed Sep. 15, 2016, Interview Summary, dated May 22, 2019.
Ravipati, U.S. Appl. No. 15/215,443, filed Jul. 20, 2016, Advisory Action, dated Jun. 5, 2019.
Ravipati, U.S. Appl. No. 15/215,435, filed Jul. 20, 2019, Advisory Action, dated Jun. 5, 2019.
Lee, U.S. Appl. No. 15/215,446, filed Jul. 20, 2016, Interview Summary, dated May 3, 2019.
Lee, U.S. Appl. No. 15/215,446, filed Jul. 20, 2016, Advisory Action, dated Jun. 4, 2019.
Yam, U.S. Appl. No. 15/266,917, filed Sep. 15, 2016, Final Office Action, dated Feb. 4, 2019.
Yam, U.S. Appl. No. 15/266,030, filed Sep. 15, 2016, Office Action, dated Feb. 26, 2019.
Ravipati, U.S. Appl. No. 15/215,443, filed Jul. 20, 2016, Final Office Action, dated Mar. 11, 2019.
Ravipati, U.S. Appl. No. 15/215,435, filed Jul. 20, 2016, Final Office Action, dated Mar. 14, 2019.
Lee, U.S. Appl. No. 15/215,446, filed Jul. 20, 2016, Final Office Action, dated Mar. 12, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Jain, U.S. Appl. No. 15/093,506, filed Apr. 7, 2016, Office Action, dated Mar. 20, 2019.
Urbano Randy et al., "Oracle Database Administrator's Guide", 12c Release dated Jul. 31, 2017, pp. 1-1500.
Zisman et al., "An approach to interoperation between autonomous database systems", Distrib. Syst. Engng 6 (1999) 135-148. Printed in the UK, 15 pages.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Rodd et al., "Adaptive Tuning Algorithm for Performance tuning of Database Management System", (IJCSIS) International Journal of Computer Science Information Security,vol. 8, No. 1, Apr. 2010, 4pgs.
Pavlo, "Self-Driving Database Management Systems", 8th Biennial Conference on Innovative Data Systems Research (CIDR '17), Jan. 8-11, 2017, Chaminade, California, USA, 6 pages.
Maenhaut et al., "Design and Evaluation of a Hierarchical Multi-Tenant Data Management Framework for Cloud Applications", dated 2015, 6 pages.
Das et al., "Scalable and Elastic Transactional Data Stores for Cloud Computing Platforms", dated Dec. 2011, 302 pages.
Das et al., "Automated Demand-Driven Resource Scaling in Relational Database-as-aService", SIGMOD'16, Jun. 26-Jul. 1, 2016, San Francisco, CA, USA, 12 pages.
Beschastnikh et al., "Machine Learning for Automatic Physical DBMS Tuning", dated Dec. 6, 2007, 6 pages.
Agrawal et al., "Database Scalability, Elasticity, and Autonomy in the Cloud", dated 2011, 14 pages.
Yam, U.S. Appl. No. 15/266,917, filed Sep. 15, 2016, Office Action, dated Jun. 21, 2019.
Ravipati, U.S. Appl. No. 15/215,443, filed Jul. 20, 2016, Office Action, dated Jul. 18, 2019.
Jain, U.S. Appl. No. 15/093,506, filed Apr. 7, 2016, Interview Summary, dated Jul. 8, 2019.
Oracle, "White Paper for Oracle Multitenant", dated Jun. 2013, 53 pages.
Oracle White Paper Database Live Migration with Oracle Multitenant and the Oracle Universal Connection Pool on Oracle Real Application Clusters (RAC), dated Oct. 15, 2014, 13 pages.
Copeland, George et al., "Data Placement in Bubba," ACM 0897912683, 1988, pp. 99-108.
Agrawal et al., "Automated Selection of Materialized Views and Indexex for SQL Databases", In Proceedings of the 26th International Conference on the Very Large Databases, dated 2000, 10 pages.
Francisco Munoz et al., "Oracle Database 12c Backup and Recovery Survival Guide", dated Sep. 24, 2013, 8 pages.
Erickson, Gail et al., "Improving Performance with SQL Server 2000 Indexed Views," Microsoft TechNet, Sep. 2000, Nov. 11, 2006, 10 pages.
Englert, Susan et al., A Benchmark of NonStop SQL Release 2 Demonstrating Near-Linear Speedup and Scaleup on Large Databases,Tandem Part No. 27469, May 1989, 32 pages.
Dominic Betts et al., "Developing Multi-Tenant Applications for the Cloud," 3rd Edition, Microsoft, 2012, 246 pages.
Dewitt, et al., "A Performance Analysis of the Gamma Database Machine," Computer Sciences Department, University of Wisconsin, 1988, pp. 350-360.
Deutsch, Alin et al., Minimization and Group-By Detection for Nested Xqueries,University of California, San Diego, 2003, 15 pages.
Dehaan, David, "A Rewriting Algorithm for Multi-Block Aggregation Queries and Views using Prerequisites and Compensations", Technical Report CS-2004-25, May 3, 2004, 39 pages.
Dayal, Umeshwar,Of Nests and Trees: A Unified Approach to Processing Queries That Contain Nested Subqueries, Aggregates and Quantifiers, Brighton 1987, pp. 197-208.
Garcia-Molina et al., "Database System Implementation", dated Jan. 1, 2000, 84 pages.
Dageville et al., "Automatic SQL Tuning in Oracle 10g", In Proceedings of the Thirteenth International Conference on Very Large Databases, vol. 30, dated 2004, 12 pages.
Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.
Chaudhuri, Surajit, An Overview of Query Optimization in Relational Systems, Microsoft Research, 1998, 10 pages.
Chaudhuri, Surajit et al., Including Group-By in Query Optimization, Proceedings of the 20th VLDB Conference, 1994, pp. 354-366.
Borla-Salamet, Pascale, Compiling Control into Database Queries for Parallel Execution Management, IEEE Conference on Parallel Distributed Information Systems, 1991, pp. 271-279.
Bhide, Anupam, "An Analysis of Three Transaction Processing Architectures", Computer Science Division, UC Berkeley, Proceeding of the 14th VLDB Conference,1998, pp. 339-350.
Bergsten, et al., Prototyping DBS3 a Shared-Memory Parallel Database System, IEEE 818622954, 226-234, 1991, pp. 226-234.
Bello, Randall G. et al. Materialized Views in Oracle, VLDB '98, Proceedings of 24th International Conference, dated Aug. 24-27, 1998, New York City, New York, USA, pp. 659-664.
Arawal et al., "Database Tuning Advisor for Microsoft SQL Server 2005: Demo", In Proceedings of the 2005 ACM Sigmod International Conference on Management of Data, dated 2005, 3 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.

(56) References Cited

OTHER PUBLICATIONS

Ahmed, Rafi, et al., "Cost-Based Query Transformation in Oracle", Copyright 2006 VLDB, ACM 1595933859, pp. 1026-1036.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Muhammad Anwar, "How to Install Oracle 12c Multitenant Pluggable Database", Dated Feb. 24, 2012, 27 pages.
Stonebraker, Michael, et al. "The Design of XPRS," Proceedings of the 14th VLDB Conference, 1988, pp. 318-330.
Seshadri, Preveen, Cost-Based Optimization for Magic: Algebra and Implementation, SIGMOND '96, 1996 ACM 0-89791-794-4, pp. 435-446.
Selinger, P. Griffiths, et al., Access Path Selection in a Relational Database Management System, ACM SIGMOD International Conference on the Management of Data, 1979, pp. 23-34.
Rajeev Kumar et al., "Oracle DBA, A Helping Hand," Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Pirahesh, Hamid, et al., Extensible/Rule Base Query Rewrite Optimization in Starburst, IBM Almaden Research Center, ACM, Sigmod, dated 1992, 10 pages.
Oracle® Database Performance Tuning Guide 10g Release 2 (10.2) Using Plan Stability, pp. 18-1 to 18-10, 10gR2 released Jul. 11, 2005.
Oracle, "Database Concepts", 15 Backup and Recovery, dated 2016, 24 pages.
Oracle Base, Multitenant: Create and Configure a Pluggable Database (PDB) in Oracle Database 12c Release 1 (12.1), dated Jan. 8, 2014, 16 pages.
Galindo-Legaria, Cesar et al., Outerjoin Simplification and Reordering for Query Optimization, ACM Transactions on Database Systems, vol. 22, No. 1, Mar. 1997, pp. 43-74.
Muralikrishna, M., Improved Unnesting Algorithms for Join Aggregate SQL Queries, VLDB Conference, Canada, 1992, 12 pages.
Tandem, "A Benchmark of NonStop SQL on the Debit Credit Transaction", The Tandem Performance Group, 1988, 26 pages.
Moro, Gianluca et al. "Incremental maintenance of multi-source views", Database Conference, 2001, ADC 2001, Proceedings, 12th Australasian, Jan. 2001, pp. 13-20.
Mishra, Priti et al., Join Processing in Relational Databases, ACM Computing Surveys, vol. 24, No. 1, Mar. 1992, pp. 63-113.
Lumpkin, George et al., Query Optimization in Oracle 9i, Oracle Corporation, Oracle White Paper, Feb. 2002, pp. 1-30.
Leverenz et al., Oracle 8i Concepts Release 8.1.5-A67781-01, Oracle Corporation, Feb. 1999, <http://www.csee.umbc.edu/help/oracle8/server.815/a67781/toc.htm>, 122 pages.
Kung, Chenho, "Object Subclass Hierarchy in SQL: A Simple Approach", Communications of the AC, Jul. 1990, vol. 33, No. 7, pp. 117-125.
Hong, et al., Optimization of Parallel Query Execution Plans in XPRS, IEEE, 1991, 8 pages.
Hirano, et al., Load Balancing Algorithm for Parallel Processing on Shared Memory Multiprocessor, IEEE, pp. 210-217, 1991.
Hayu, John, Analytic SQL Features in Oracle9i, An Oracle Technical White Paper, Dec. 2001, 32 pages.
Graefe, Goetz, "Encapsulation of Parallelism in the Volcano Query Processing System," Mar. 1990, 14 pages.
Gopalkrishnand, Vivikanand, et al., "Issues of Object-Relational View Design in Data Warehousing Environment", IEEE 1998, 0780347781, pp. 2732-2737.
Najjar, Faiza et al. "Cardinality estimation of distributed join queries", dated Sep. 1-3, 1999; Proceedings of theTenth International Workshop, pp. 66-70.
Ravipati, U.S. Appl. No. 15/215,443, filed Jul. 20, 2016, Final Office Action, dated Dec. 4, 2019.
Rajamani, U.S. Appl. No. 15/254,884, filed Sep. 1, 2016, Notice of Allowance, dated Nov. 20, 2019.
Lee, U.S. Appl. No. 15/215,446, filed Jul. 20, 2019, Final Office Action, dated Dec. 4, 2019.
Krugikov, U.S. Appl. No. 15/266,902, filed Sep. 15, 2016, Notice of Allowance, dated Nov. 2, 2019.
Jain, U.S. Appl. No. 15/093,506, filed Apr. 7, 2016, Final Office Action, dated Oct. 28, 2019.
Yam, U.S. Appl. No. 15/266,917, filed Sep. 15, 2016, Notice of Allowance, dated Jan. 6, 2020.
Yam, U.S. Appl. No. 15/266,030, filed Sep. 15, 2016, Notice of Allownace, dated Dec. 20, 2019.
Yam, U.S. Appl. No. 15/266,030, filed Sep. 15, 2016, Notice of Allowability, dated Feb. 14, 2020.
Ravipati, U.S. Appl. No. 15/215,435, filed Jul. 20, 2016, Advisory Action, dated Jan. 24, 2020.
Ravipati, U.S. Appl. No. 15/215,435, filed Jul. 20, 2016, Interview Summary, dated Jan. 15, 2020.
Jain, U.S. Appl. No. 15/093,506, filed Apr. 7, 2016, Notice of Allowance, dated Jan. 6, 2020.
U.S. Appl. No. 12/188,975, filed Aug. 8, 2008, Office Action, dated Dec. 21, 2011.
Kruglikov, U.S. Appl. No. 15/266,902, filed Sep. 15, 2016, Office Action, dated Aug. 6, 2018.
Raj amani, U.S. Appl. No. 15/254,884, filed Sep. 1, 2016, Office Action, dated Jun. 27, 2018.
Ravipati, U.S. Appl. No. 15/215,435, filed Jul. 20, 2016, Office Action, dated Sep. 19, 2018.
Ravipati, U.S. Appl. No. 15/215,443, filed Jul. 20, 2016, Office Action, dated Sep. 19, 2018.
U.S. Appl. No. 12/188,673, filed Aug. 8, 2008, Final Office Action, dated Dec. 22, 2011.
U.S. Appl. No. 12/188,673, filed Aug. 8, 2008, Advisory Action, dated Mar. 23, 2011.
U.S. Appl. No. 12/188,975, filed Aug. 8, 2008, Office Action, dated May 17, 2013.
U.S. Appl. No. 12/188,975, filed Aug. 8, 2008, Final Office Action, dated May 14, 2012.
U.S. Appl. No. 12/188,975, filed Aug. 8, 2008, Interview Summary dated Dec. 17, 2013.
U.S. Appl. No. 12/188,975, filed Aug. 8, 2008, Office Action, dated Nov. 29, 2010.
U.S. Appl. No. 12/188,975, filed Aug. 8, 2008, Advisory Action, dated Feb. 6, 2014.
U.S. Appl. No. 12/188,975, filed Aug. 8, 2008, Notice of Allowance, dated Jul. 24, 2014.
U.S. Appl. No. 12/188,975, filed Aug. 8, 2008, FInal Office Action, dated Oct. 17, 2013.
U.S. Appl. No. 12/188,981, filed Aug. 8, 2008, Final Office Action, dated Jun. 7, 2011.
U.S. Appl. No. 12/188,981, filed Aug. 8, 2008, Notice of Allowance, dated Aug. 17, 2012.
U.S. Appl. No. 12/188,981, filed Aug. 8, 2008, Office Action, dated Feb. 21, 2012.
U.S. Appl. No. 12/1888,975, filed Aug. 8, 2008, Final Office Action, dated May 9, 2011.
U.S. Appl. No. 14/202,091, filed Mar. 10, 2014, Notice of Allowance, dated Feb. 26, 2016.
U.S. Appl. No. 188,981, filed Aug. 8, 2008, Office Action, dated Nov. 23, 2010.
U.S. Appl. No. 12/188,975, filed Aug. 8, 2008, Final Office action, dated Dec. 24, 2013.
Ravipati, U.S. Appl. No. 15/215,443, filed Jul. 20, 2016, Interview Summary, dated Jan. 4, 2019.
Ravipati, U.S. Appl. No. 15/215,435, filed Jul. 20, 2016, Interview Summary, dated Jan. 4, 2019.
Rajamani, U.S. Appl. No. 15/254,884, filed Sep. 1, 2016, Final Office Action, dated Nov. 21, 2018.
Sata's DBA Blog: "Oracle Statistics", dated Jan. 3, 2013, http://satya-dba.blogspot.com/2010/06/oracle-database-statistics-rbo-cbo.html, 14 pages.
Lee, U.S. Appl. No. 15/215,446, filed Jul. 20, 2016, Office Action, dated May 8, 2020.

(56) References Cited

OTHER PUBLICATIONS

Kuremoto et al., "Time Series Forecasting Using Restricted Boltzmann Machine", Emerging Intelligent Computing Technology and Applications: 8th International Conference, dated Jul. 2012, 11 pages.
Ravipati, U.S. Appl. No. 15/215,443, filed Jul. 20, 2016, Notice of Allowance, dated Oct. 15, 2020.
Ravipati, U.S. Appl. No. 15/215,435, filed Jul. 20, 216, Notice of Allowance, dated Oct. 15, 2020.
Ravipati, U.S. Appl. No. 15/215,443, filed Jul. 20, 2016, Office Action, dated May 6, 2020.
Ravipati, U.S. Appl. No. 15/215,435, filed Jul. 20, 216, Office Action, dated May 6, 2020.
Hung, U.S. Appl. No. 16/055,468, filed Aug. 9, 2018, Office Action, dated Feb. 1, 2021.
Hung, U.S. Appl. No. 16/055,468, filed Aug. 9, 2018, Final Office Action, dated Jun. 9, 2021.
Yu et al., "Intelligent Database Placement in Cloud Environment", 2012 IEEE 19th International Conference on Web Services, Year 2012, 8 pages.
Yu et al., "Intelligent Database Placement in Cloud Environment," 2012 IEEE 19th International Conference on Web Services, 2012, pp. 544-551.

\* cited by examiner

RULE-BASED AUTONOMOUS DATABASE CLOUD SERVICE FRAMEWORK

RELATED APPLICATIONS AND CLAIM OF PRIORITY

This application claims the benefit of Provisional Application No. 62/566,156, filed Sep. 29, 2017, titled "Rule-Based Autonomous Database Cloud Service Framework", the entire contents of which is hereby incorporated by reference as if fully set forth herein, under 35 U.S.C. § 119(e). The applicant(s) hereby rescind any disclaimer of claim scope in the parent application or the prosecution history thereof and advise the USPTO that the claims in this application may be broader than any claim in the parent application. The following related patent and applications are incorporated herein by reference:
- U.S. application Ser. No. 16/055,468 filed Aug. 6, 2018, titled "Autonomous Multitenant Database Cloud Service Framework";
- U.S. Pat. No. 9,396,220 filed Mar. 10, 2014 titled "Instantaneous Unplug of Pluggable Database From One Container Database And Plug Into Another Container Database";
- U.S. Pat. No. 8,903,801 filed Aug. 8, 2008 titled "Fully Automated SQL Tuning";
- U.S. Pat. No. 8,341,178 filed Aug. 8, 2008 titled "SQL Performance Analyzer";
- U.S. application Ser. No. 15/215,435 filed Jul. 20, 2016 titled "Cloning A Pluggable Database in Read-Write Mode";
- U.S. application Ser. No. 15/266,902 filed Sep. 15, 2016 titled "Provisioning of Pluggable Databases Using a Central Repository";
- U.S. application Ser. No. 15/266,030 filed Sep. 15, 2016 titled "Automatic Reconfiguration of Relocated Pluggable Databases";
- U.S. application Ser. No. 15/254,884 filed Sep. 1, 2016 titled "Transportable Backups for Pluggable Database Relocation";
- U.S. Pat. No. 9,692,819 filed Apr. 13, 2015 titled "Detect Process Health Remotely in a Realtime Fashion";
- U.S. application Ser. No. 15/215,443 filed Jul. 20, 2016 titled "Techniques for Keeping a Copy of a Pluggable Database Up to Date with Its Source Pluggable Database in Read-Write Mode";
- U.S. application Ser. No. 15/215,446 filed Jul. 20, 2016 titled "Near-Zero Downtime Relocation of a Pluggable Database Across Container Databases"; U.S. application Ser. No. 15/266,917 filed Sep. 15, 2016 titled "Asynchronous Shared Application Upgrade".

FIELD OF THE DISCLOSURE

This disclosure relates to administration of a multitenant data grid. Presented herein are data cloud administration techniques that achieve autonomy by using a rules engine that reacts to a database system event by autonomously submitting an asynchronous job to reconfigure a database.

BACKGROUND

Today's leading-edge organizations differentiate themselves through analytics to further their competitive advantage by extracting value from all their data sources. Other companies are looking to become data-driven through the modernization of their data management deployments. These strategies include challenges, such as the management of large growing volumes of data. Today's digital world is already creating data at an explosive rate, and the next wave is on the horizon, driven by the emergence of internet of things (IoT) data sources. The physical data warehouses of the past were great for collecting data from across the enterprise for analysis, but the storage and compute resources needed to support them are not able to keep pace with the explosive growth. In addition, the manual cumbersome task of patch, update, upgrade poses risks to data due to human errors. To reduce risks, costs, complexity, and time to value, many organizations are taking their data warehouses to the cloud. Whether hosted locally in a private cloud, outsourced to a public cloud service, or a mixture of the two, the cloud offers simpler management, higher scalability and availability with ensured performance, and new ways to cut the costs associated with data storage and processing.

The velocity and volume of incoming data is placing crushing demands on traditional data marts, enterprise data warehouses, and analytic systems. Typical data warehouse cloud solutions may be unable to meet such demands. Many customers are proving the value of data warehouses in the cloud through "sandbox" environments, line-of-business data marts, and database backups. More advanced monetization use cases include high-performance data management projects, data warehouses coupled with cloud computing analytics, and big data cloud implementation.

Production operations staff typically includes database administrators (DBAs) and other system administrators to perform database lifecycle management and administrative tasks. Hosting relationships between databases and computers are more or less rigidly arranged into a network topology, such that software upgrades, horizontal scaling, and planned or emergency provisioning/configuration may be tedious and error prone, especially at cloud scale order(s) of magnitude larger than a simple computer cluster.

Rigid topology may hinder or prevent horizontal scaling (elasticity) and capacity planning. Database and data center administration typically occurs ad hoc and is typically based on imperative commands that are expected to execute more or less immediately. Thus, administrative chores tend to be synchronous in nature, such that opportunities for parallelism are limited. Thus, administrative job submission and job execution tend to be tightly coupled, thereby needing significant manual shepherding to achieve sequencing of related administrative activities. Thus, conventional opportunities for cloud-scale administrative automation may be limited. Thus, the evolution and migration of installed pluggable databases may also be limited, such as when tolerating a mediocre topology is easier than optimally rearranging pluggable databases. For example, relocation of a pluggable database from one container database and/or computer to another may require repackaging and redeployment of many clients and/or services, which may weigh against such relocation.

Human database tuning and administration is both slow and error-prone. Quality of administration is also highly variant depending on the knowledge level of human database administrators (DBAs). One way that industry solves that problem is by hiring expert DBAs to somewhat reduce errors and somewhat improve performance, which may more or less mitigate but incompletely solve various problems associated with scale. What is needed is a solution for delivering business insights with unmatched reliability that can virtually guarantee avoidance of manual error-prone human management processing. Thus reliability, availability, and serviceability (RAS), as well as efficiency and performance, of a data grid should be improved to a previously unattainable extent.

DETAILED DESCRIPTION

Figure 1:
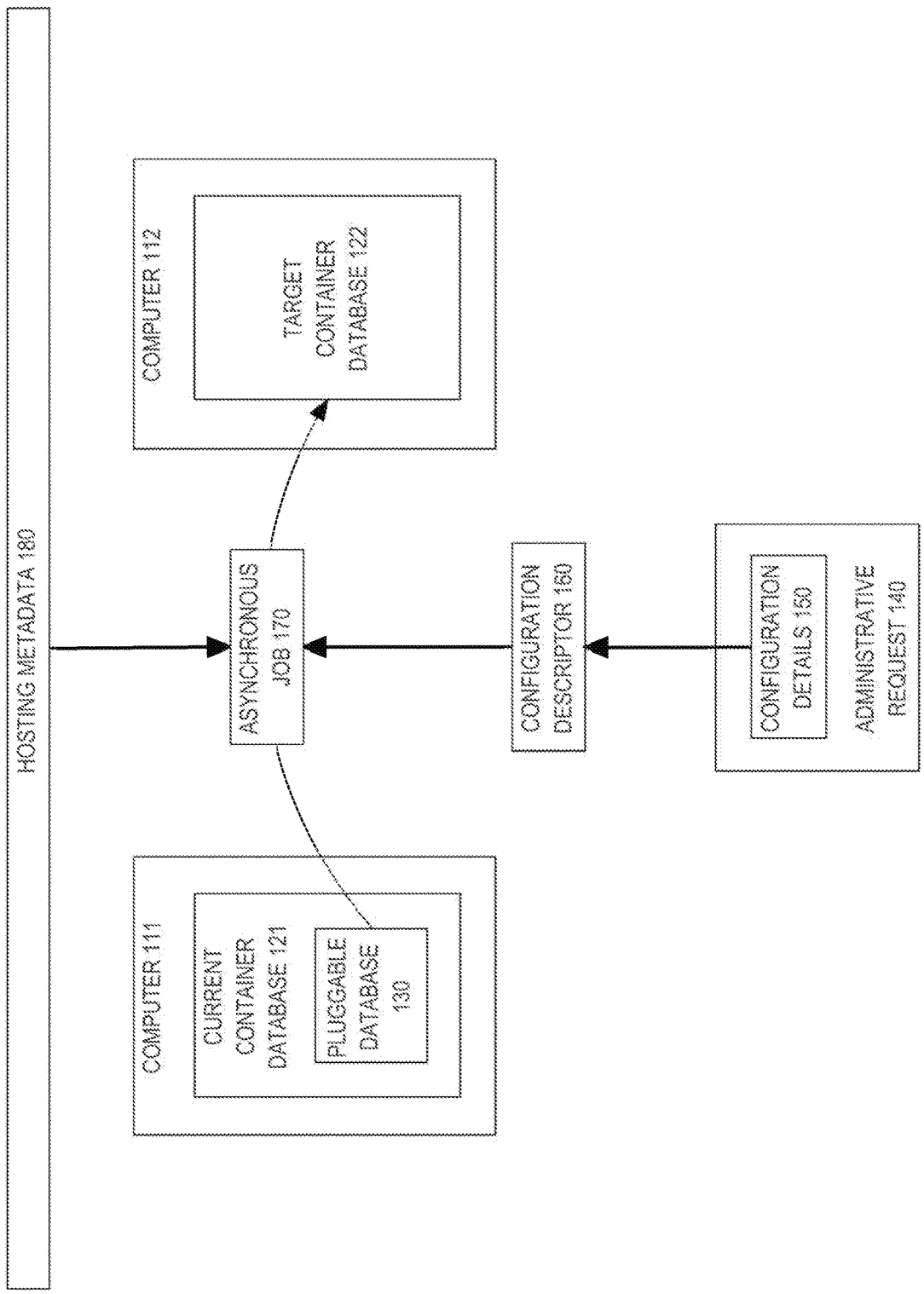
FIG. 1 is a block diagram that depicts an example cloud that uses an asynchronous job to eventually execute an administrative configuration request for a pluggable database, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Example Data Grid
  2.1 Container Database and Pluggable Database
  2.2 Administrative Request
  2.3 Configuration Details
  2.4 Configuration Descriptor
  2.5 Asynchrony
  2.6 Hosting Metadata
  2.7 Post Processing
 3.0 Asynchronous Configuration Process
 4.0 Autonomous Reconfiguration
  4.1 Monitor
  4.2 Upgrade/Downgrade
 5.0 Example Autonomous Database Cloud
  5.1 Database System Events
  5.2 Event Categories
  5.3 Rules Engine
  5.4 Rules
 6.0 Example Autonomous Administration Process
  6.1 Stimulus
  6.2 Reaction
  6.3 Chain Reaction
 7.0 Machine Learning
  7.1 Optimization Algorithms
  7.2 Rules API
 8.0 Training
  8.1 Event Delivery
  8.2 History Replay
  8.3 Weighted Attributes
  8.4 Training Confidence
  8.5 Retraining
  8.6 Retention Priority
  8.7 Example Technology Stack
 9.0 Rules Interference
  9.1 Condition Recognition
  9.2 Templating
  9.3 Holistic Efficiency
  9.4 Example Administration and Maintenance Tasks
 10.0 Example Autonomous Tuning Process
  10.1 Statistics
  10.2 Predicate Selectivity
  10.3 Cost-Benefit Analysis
  10.4 Example Tuning Scenarios
 11.0 Database System Overview
 12.0 Pluggable Database and Container Database System Overview
 13.0 Hardware Overview
 14.0 Software Overview
 15.0 Cloud Computing
 1.0 General Overview Presented herein are autonomous techniques for administering database clouds. Two major components of the example systems herein are an asynchronous guaranteed execution job framework and an event-based automatic rule engine. These major components facilitate automated administration and performance optimization of an ecosystem of database management system(s) (DBMSs), which may include multitenant databases and/or hierarchies or federations of databases. A DBMS is explained in more detail in the DATABASE SYSTEM OVERVIEW section below. In some cases, there may be structural aggregation (e.g. nesting) of databases, such as when pluggable databases (PDBs) reside within container databases (CDBs). Nesting of a PDB within a CDB is explained in more detail in the PLUGGABLE DATABASE AND CONTAINER DATABASE SYSTEM OVERVIEW section below.

The elastic nature of an online cloud, such as a data cloud, entails a dynamic topology and, at least in the case of a public cloud, multitenancy. With techniques herein, a data cloud may be configured as a dynamic ecosystem of resources, including datastores and analytics, that may experience disturbances such as demand spikes, network weather, maintenance, and capacity growth, which have varying degrees of unpredictability. Herein is a DBMS-integrated rules engine for an asynchrony framework, based on various mechanisms and techniques, for configuring intelligent reactions that optimize cloud performance during changing environmental conditions.

The DBMSs herein may provide or cooperate with mechanisms of database transportability, such that a database may be automatically replicated or relocated. Thus, a cloud's logical topology and load distribution may be dynamic and optimizable. For example, a point of delivery (PoD) may be a unit of logical co-location of services. In an embodiment, computer may host one or more PoDs, each of which may host one or more container databases, each of which may host one or more pluggable databases. Creation, replication, movement, and removal of databases instance(s) may occur according to a well defined (e.g. uniform) lifecycle of a database.

The rules engine may submit asynchronous jobs for execution of some or all pluggable database (PDB) lifecycle tasks across a set of points of delivery (PoDs), container databases, or other database hosting middleware. In an embodiment, the asynchronous job framework provides representational state transfer (REST) APIs for clients to submit requests which are then translated into asynchronous jobs. An asynchronous job is a unit of work that may be deferred, such as with scheduling or queueing. Asynchronous jobs may be submitted in one ordering and then executed in another temporal ordering. All aspects of job management, including persistence, scheduling, assignment, execution, recovery and error handling are handled within the system. Jobs are routed to the correct PoD where it is executed using the PoD APIs. The major components including request broker, event broker, and rules engine are independently and horizontally scalable.

The rules engine accepts events and translates them into job specifications for execution. Events from the PoD databases are ingested by the events broker, which then filters and classifies the events and feeds them into both the rule engine and machine learning engine. Rules are generated both automatically and manually to enable the system to tune and manage itself.

Generally, a rule engine may be a logic interpreter that achieves customizability and maintainability by dividing its codebase into rules that are editable/replaceable and a hardened engine to interpret the rules. Rules may conform to a formal grammar that the engine may parse. To some extent, rules may be processed and/or stored as data, even though rules encode logic. Thus, rules may be automatically modified, such as according to analytics and/or machine learning. In an embodiment, rules may be self-modifying. A rule may contain a predicate to evaluate and a consequence to occur if the predicate is satisfied. A predicate may evaluate combinations of conditions, such as variables and/or events. A rule may alter conditions by updating variables and/or raising additional events. Thus, related rules may interact to achieve inferencing that derives information and/or sequencing for compound behaviors. Rules, rule activation, and rule evolution are discussed later herein with regards to autonomous administration and performance optimization of a data cloud. Rule-based generation and orchestration of asynchronous database administration jobs are discussed later herein. Rules tuning and evolution based on machine learning are discussed later herein.

Solutions presented herein have asynchronous jobs that configure or reconfigure pluggable databases, such as an asynchronous database administration job. For example, an asynchronous database administration job may create or drop an index of a relational table, or create, replicate, move, or remove a database instance. Generally, a database configuration or reconfiguration is a system change that defines, removes, or adjusts (e.g. redefines) a database object such as a database instance, a schema, a namespace, a table, a relation, an index, a file, or logic. Configuration may be part of provisioning and deployment of a database or database object at a given computer and/or within a given database or DBMS, such as during relocation from another computer or DBMS. Reconfiguration may be an adjustment or removal of a database or database object. Configuration or reconfiguration may entail execution of data definition language (DDL), adjustment of content of a data dictionary of a DBMS, and/or addition, alteration, or removal of resources such as files. Asynchrony may facilitate scheduling, workload balancing, and prioritization.

Each of the solutions herein has a rules engine that orchestrates asynchronous jobs for contextually appropriate behavior. The rules engine has a template engine that processes rules that are encoded in templates. Rules are conditioned upon events. Each of these solutions has a database management system (DBMS) that dynamically emits events that indicate operational conditions. An event may cause a rule to generate an administrative request to configure or reconfigure pluggable databases. For example, a pluggable database may exhaust disk space. Responsively, the DBMS may send an event to the rules engine. Execution of a rule by the rules engine may generate an administrative request to move a pluggable database from on container database or computer to another container database or computer. The rules engine sends the administrative request to a request broker as a REST request that indicates configuration details that identify a pluggable database and specify evicting (relocating) the pluggable database. The request broker dispatches an asynchronous job based on the REST request. Based on the configuration details, the asynchronous job moves the pluggable database to another container database on another computer.

In an embodiment, a rules engine receives an event from a DBMS. Based on the event, the rules engine executes a rule to generate a request that indicates configuration details for a database. The rules engine sends the request to a request broker. The request broker dispatches an asynchronous job based on the request. The asynchronous job configures the database based on the configuration details. Thus, databases in a cloud, data grid, or data center may be administered autonomously (without human intervention) based on dynamic conditions that are foreseen and unforeseen.

Figure 2:
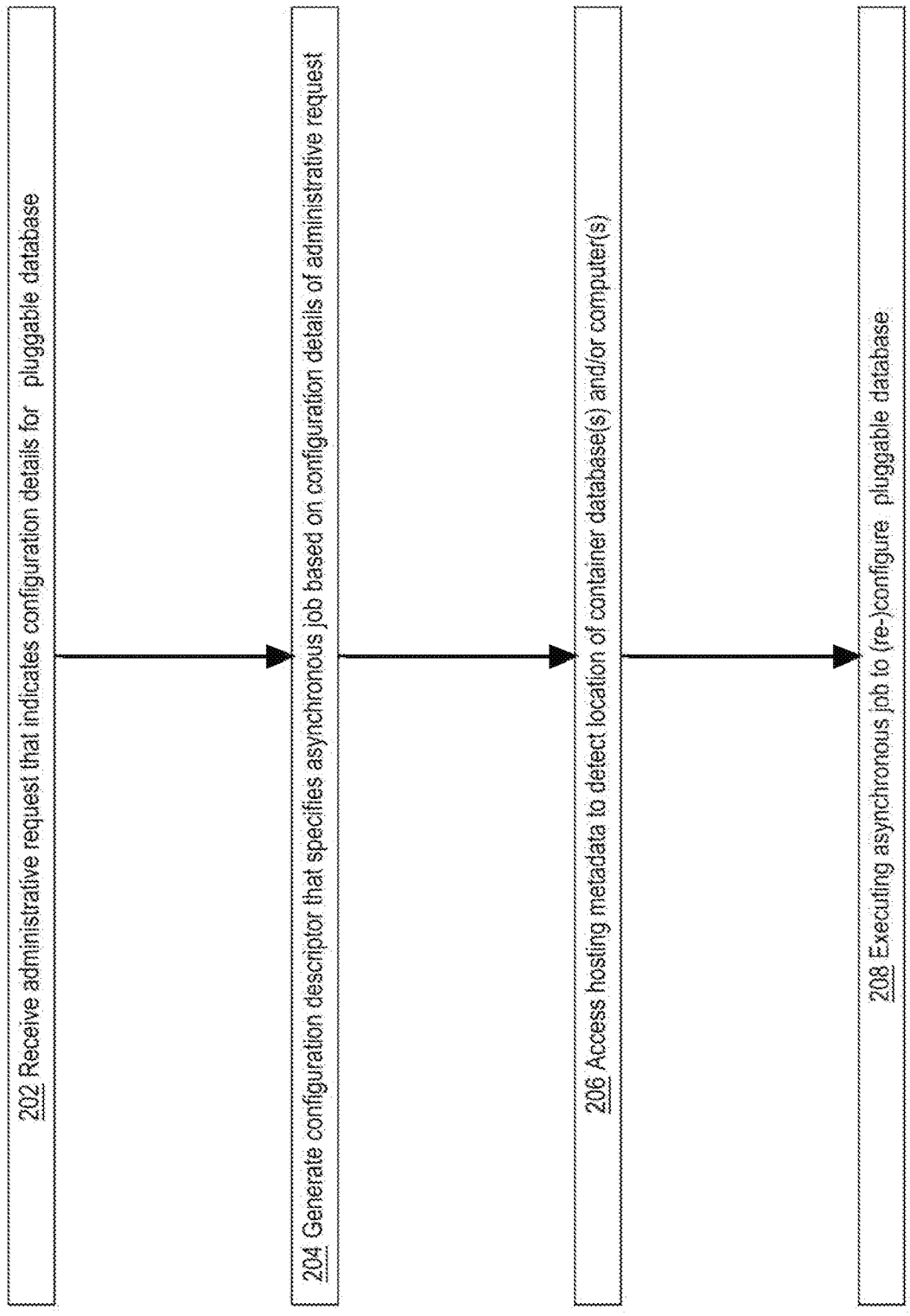
FIG. 2 is a flow diagram that depicts an example asynchronous configuration process to eventually execute an administrative request for a pluggable database, in an embodiment.
Figure 3:
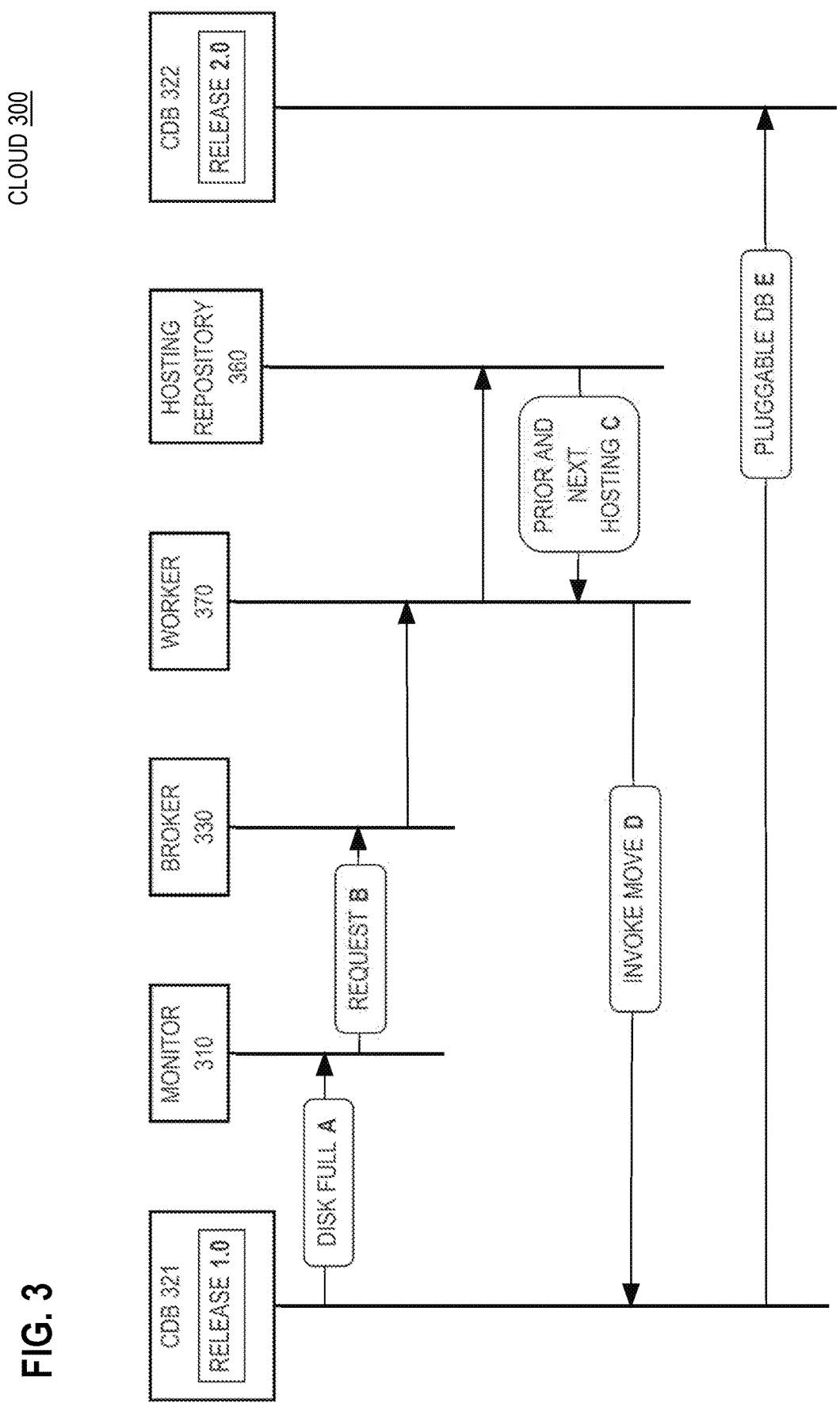
FIG. 3 is a block diagram that depicts an example cloud that has automatic reflexes to heal a topology, in an embodiment.
Figure 10:
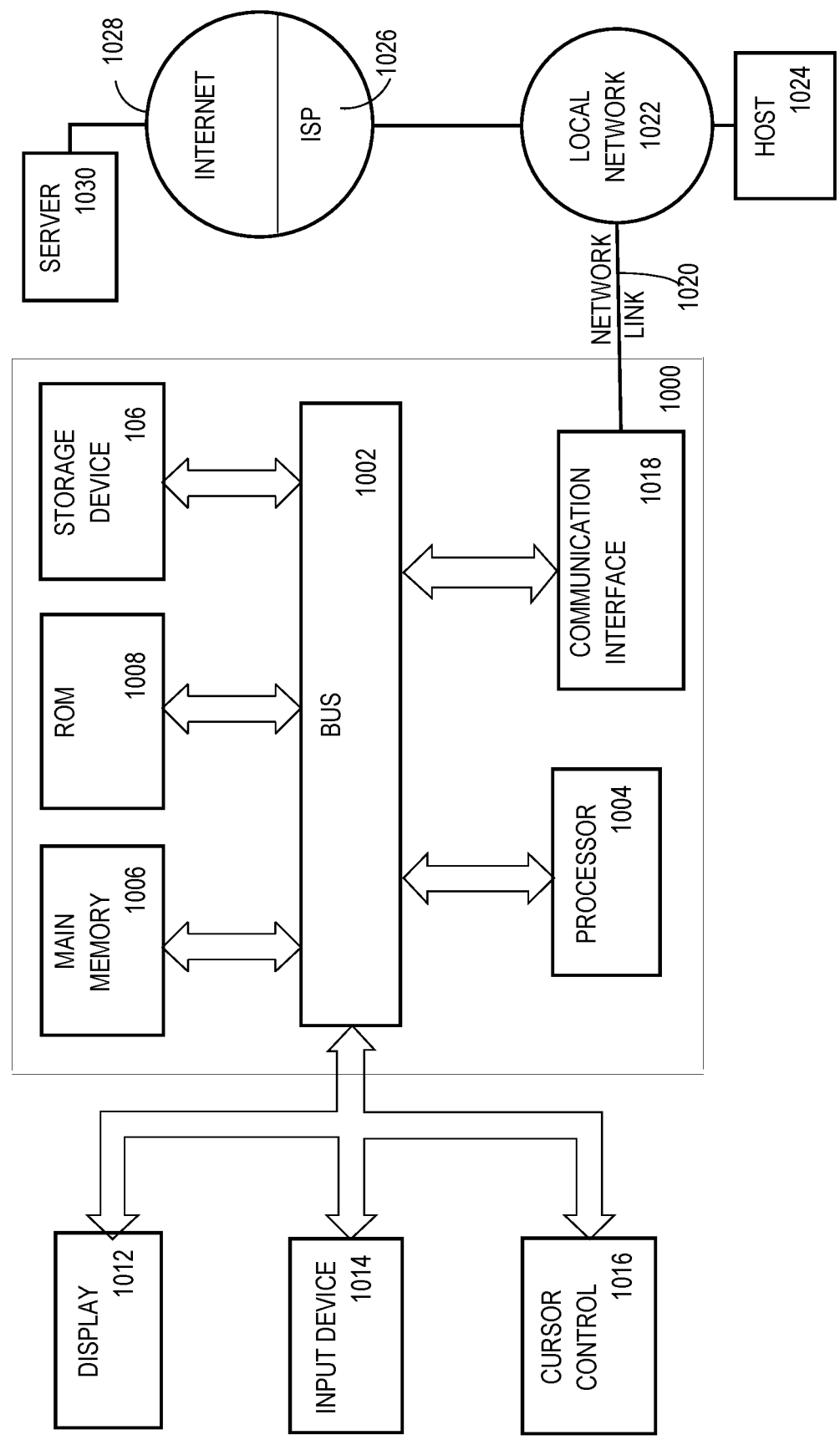
FIG. 10 is a block diagram that illustrates a computer system upon which an embodiment of the invention may be implemented.
Figure 11:
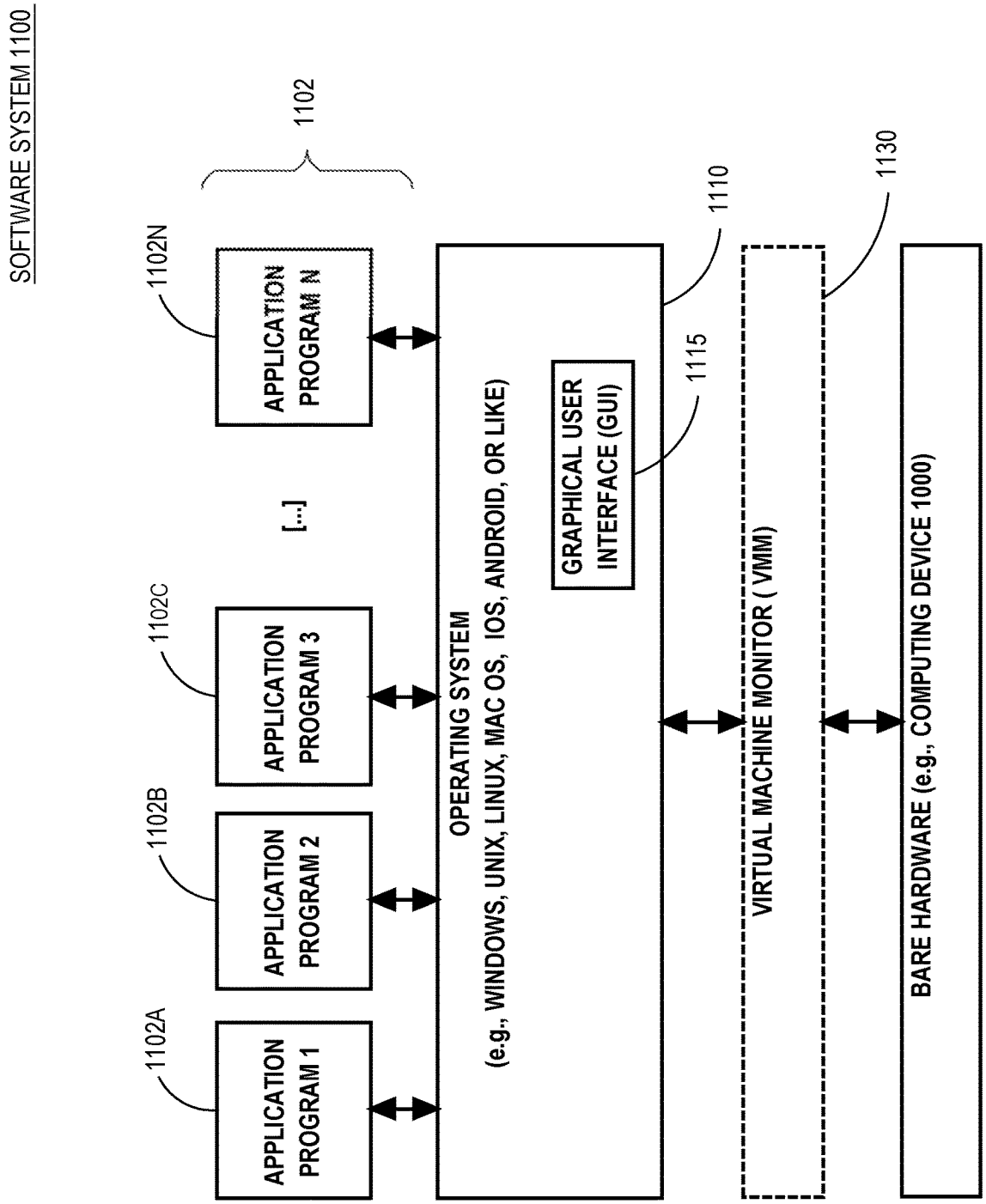
FIG. 11 is a block diagram that illustrates a basic software system that may be employed for controlling the operation of a computing system.

The solutions may have components that cause asynchrony such as queues, thread pools, swim lanes, and executors. As follows, FIGS. 1-3 depict cloud infrastructure tailored for asynchronous execution of database administration jobs. FIGS. 4-9 depict refinements of that asynchronous database administration cloud infrastructure that achieve autonomy based on a rules engine that intelligently reacts to spontaneous events from DBMS(s) by spawning asynchronous jobs. The asynchronous database administration cloud infrastructure may incorporate computing systems that FIGS. 10-11 depict. In practice, embodiments may combine the entirety or parts of some or all of the database clouds and computing systems of the figures discussed herein, as well as those presented in related U.S. application Ser. No. 16/055,468.

2.0 Example Data Grid

FIG. 1 is a block diagram that depicts an example cloud 100, in an embodiment. Cloud 100 uses an asynchronous job to eventually execute an administrative request for a pluggable database. To operate as a data grid, cloud 100 is composed of cluster(s) of computers such as 111-112 that host databases such as 121-122 and 130. For example, each of databases 121-122 and 130 may be a relational database that is managed by a same database management system (DBMS). Each of computers 111-112 may be a personal computer, rack server such as a blade, mainframe, virtual machine, or any networked computing device capable of hosting a database. Computers 111-112 may communicate with each other and other computers (not shown) via a network, such as a local area network (LAN), or network of networks such as the global Internet. Computers 111-112 may be collocated, such as on a same rack, or separated such as in different data centers.

2.1 Container Database and Pluggable Database

Cloud 100 hosts databases such as pluggable database 130 in a way that may hide topology details from clients (not shown). For example, a client may use pluggable database 130 without knowledge of which data center, computer, and container database actually host pluggable database 130. A container database, such as 121-122, may contain pluggable databases such as 130. For example, container database 121 may be shared by multiple tenants that may or may not share various pluggable databases that are hosted by the container database 121.

2.2 Administrative Request

In operation, a database administrator (DBA) person or administrative software may submit administrative request 140 to create, configure, or reconfigure pluggable database 130 without knowledge of where pluggable database 130 is or will be hosted. For example, cloud 100 repeatedly may implicitly or spontaneously relocate pluggable database 130 to a different container database and/or computer at more or less arbitrary times. Thus, configuration details 150 within administrative request 140 need not identify a container database or a computer.

For example from a more or less arbitrary computer that does or does not reside within cloud 100, a DBA may submit administrative request 140 to cloud 100 for execution. Administrative request 140 may be delivered to cloud 100 as a hypertext transfer protocol (HTTP) request, such as a common gateway interface (CGI) post, a representational state transfer (REST) request, a remote procedure call (RPC), a simple object access protocol (SOAP) call, an asynchronous JavaScript XML (extensible markup language) (AJAX) request, or other remote data delivery mechanism.

2.3 Configuration Details

Administrative request 140 is goal/result oriented and need not specify a tactic or strategy to execute. For example, configuration details may specify that pluggable database 130 should be created or adjusted to suit certain high level requirements.

For example if pluggable database 130 is running out of disk space, then configuration details 150 may specify a larger amount of disk space. Cloud 100 has flexibility in fulfilling administrative request 140. For example, more disk space may be achieved by moving tablespace files of pluggable database 130 from one filesystem to another as (cross-)mounted on a same computer as before. Instead, more disk space may be achieved by adjusting the virtual machine allocation in which pluggable database 130 is hosted (and perhaps restarting the virtual machine). Instead, cloud 100 may actually have to move pluggable database 130 from one container database and/or computer to another.

Likewise if pluggable database 130 is performing poorly, then configuration details 150 may specify more processing power such as more processors, processor cores, threads, or parallelism. Cloud 100 may fulfill administrative request 140 by granting more processor cores to a virtual machine that hosts pluggable database 130. Instead, cloud 100 may actually have to move pluggable database 130 from one container database and/or computer to another to acquire more processing power.

Cloud 100 does not immediately (synchronously) execute administrative request 140. For example, fulfilling administrative request 140 may entail taking pluggable database 130 temporarily out of service. Thus, configuration details 150 may specify a time, a time window, an amount of idleness or light workload, or other dynamic condition to occur before administrative request 140 should be executed. Alternatively, cloud 100, pluggable database 130, or any involved container database or computer may be temporarily too busy (e.g. demand spike) to immediately execute administrative request 140. Thus, cloud 100 may queue, buffer, or otherwise defer execution of administrative request 140.

2.4 Configuration Descriptor

Cloud 100 uses configuration descriptor 160 and asynchronous job 170 for deferred execution of administrative request 140. Upon receipt of administrative request 140, cloud 100 generates configuration descriptor 160 based on administrative request 140 and configuration details 150. Configuration descriptor 160 encodes a normalized specification of administrative request 140 in a format suitable for storage and eventual dispatch to asynchronous job 170 for execution. Configuration descriptor 160 may be an encoded document such as XML, or JavaScript object notation (JSON). Normalization may entail conversion and/or scaling of numeric units (as discussed later herein) or range limiting. For example, configuration details 150 may specify overnight execution, which cloud 100 may translate into configuration descriptor 160 as a time window of particular late-night hours. For example, a request for less than a minimum amount of a resource may be rounded up. Also, as discussed later herein, specified amounts of resources may be interdependent in enforceable ways, such as allocated volatile memory should not exceed allocated durable storage.

Cloud 100 may buffer or store configuration descriptor 160 in memory, in a database, or in a file. Cloud 100 may (e.g. synchronously) acknowledge to whichever client submitted administrative request 140 that the request is accepted and pending. For example if administrative request 140 arrived as an HTTP request, then cloud 100 may synchronously send an HTTP response that acknowledges that administrative request 140 has at least been queued. The acknowledgement may include a tracking identifier that the client may subsequently use to cancel, pause, or poll for status of administrative request 140. The acknowledgement may include an object oriented receiver (such as a computational future, a remote future, or a smart stub) that can poll and/or wait for administrative request 140 to actually be fulfilled. A receiver may be an instance of an object-oriented class. A receiver may be active, such as a smart stub that polls for status. A stub is a remote proxy. A smart stub is a stub that includes extra logic for flexibility for locating service(s) and/or managing repetition such as polling or retries. A receiver may be passive, such as suspended while waiting for a status or completion message or signal from cloud 100.

2.5 Asynchrony

Upon generation of configuration descriptor 160, cloud 100 may immediately or eventually create (or reuse) asynchronous job 170 to execute administrative request 140 based on configuration descriptor 160. For example, asynchronous job 170 may be reused from a pool of lightweight threads, heavyweight operating system processes, or other executors. Upon assigning configuration descriptor 160 to asynchronous job 170, asynchronous job 170 may immediately or eventually execute (fulfill) administrative request 140 according to configuration descriptor 160. For example, asynchronous job 170 may idle until configuration descriptor 160 is assigned to it. For example, configuration descriptor 160 may specify that execution of administrative request 140 should not begin until midnight.

Alternatively, asynchronous job 170 may execute other requests one at a time from a queue of pending configuration descriptors. When configuration descriptor 160 eventually reaches the head of the queue, asynchronous job 170 may de-queue and execute configuration descriptor 160. For example, configuration descriptor 160 may be a JSON document in a Java message service (JMS) queue. In embodiments, the queue may be a priority queue based on any of: a) a priority indicated in configuration descriptors such as 160, b) a deadline (completion time) or time to live (TTL) indicated in configuration descriptors, or c) a request type such as create database, move database, increase database quality of service, replicate database, etc. For example, backup and replica creation are naturally low priority. Whereas, increasing quality of service is naturally high priority because a database is becoming inadequate, such as rising latency or exhausting disk space. Database restoration from backup may be urgent.

2.6 Hosting Metadata

Asynchronous job 170 may load, parse, or otherwise process configuration descriptor 160 to discover what configuration change(s) to execute for a pluggable database. If configuration descriptor 160 does not identify a container database or computer, cloud 100 may retrieve needed identifiers from hosting metadata 180. Hosting metadata 180 provides directory information that maps an identifier of a pluggable database to identifiers of a container database and/or computer that hosts the pluggable database. Hosting metadata 180 may be implemented with a lookup table, a database table, or other referential data structure such as a map. Hosting metadata may be deployed as a file, a network service, or otherwise. Hosting metadata 180 may have additional information such as measurements of resource capacities and utilizations, resource requirements, and database interdependencies. For example, hosting metadata 180 may indicate facts such as: a) a particular container database has a particular pluggable databases, b) an amount of disk space is used by a particular pluggable database, c) a count of processing cores a particular computer has, d) a particular physical computer hosts particular virtual computers, e) a particular computer hosts particular container databases, f) particular container databases have replicas of a particular pluggable database, g) particular container databases host data partitions of a particular multi-instance pluggable database, and h) particular computers and databases have particular flavors, release levels, and patch levels.

For example, asynchronous job 170 may detect that configuration descriptor 160 specifies three processor cores for pluggable database 130. Asynchronous job 170 may consult hosting metadata 180 to discover that pluggable database 130 resides in current container database 121 that resides on computer 111. Hosting metadata 180 may indicate: a) current container database 121 is limited to two processing cores, even though b) computer 111 has four processing cores. Thus, asynchronous job 170 may decide that pluggable database 130 needs to be moved to a different container database. For example, hosting metadata 180 may indicate: a) computer 112 also has four processing cores and, b) target container database 122 has no limit on using processing cores. Thus, asynchronous job 170 may select target container database 122 for where to move pluggable database 130 to. Thus, asynchronous job 170 may fulfil administrative request 140 by moving pluggable database 130 to target container database 122.

2.7 Post Processing

After fulfilling administrative request 140, asynchronous job 170 may additionally post process in various ways. Asynchronous job 170 may notify cloud 100 or a client that administrative request 140 is finished. Asynchronous job 170 may update hosting metadata 180 to reflect changes made by asynchronous job 170. Asynchronous job 170 may idle, return to a worker pool, de-queue another administrative request, or await destruction such as being garbage collected or otherwise deallocated.

3.0 Asynchronous Configuration Process

FIG. 2 is a flow diagram that depicts an example asynchronous configuration process to eventually execute an administrative request for a pluggable database using an asynchronous job, in an embodiment. FIG. 2 is discussed with reference to FIG. 1.

In step 202, an administrative request that indicates configuration details for a pluggable database is received. For example, cloud 100 receives (from an external client or from an internal facility) administrative request 140 from an administrator that wants to reconfigure pluggable database 130. For example, the administrator wants to decrease latency of pluggable database 130 by giving pluggable database 130 more memory (e.g. bigger database cache). The administrator may use a web browser to create configuration details 150 that specify a bigger amount of memory in administrative request 140.

In step 204, the cloud generates a configuration descriptor that specifies an asynchronous job based on the configuration details of the administrative request. For example, cloud 100 refers to configuration details 150 and administrative request 140 when generating configuration descriptor 160. For example, configuration descriptor 160 may be a work ticket that defines a pending unit of work. Cloud 100 may: a) prepare to immediately execute configuration descriptor 160, b) enqueue the descriptor for later execution, or c) schedule configuration descriptor 160 for execution at a relative or absolute time in the future.

In step 206, the cloud accesses hosting metadata to detect location(s) of container database(s) and/or computer(s) that already or will host the pluggable database. Although step 206 is shown as occurring between steps 204 and 208, some or all activities of step 206 may actually eagerly occur during step 204 or lazily occur during step 208. For example, selection of a target container database or computer to move pluggable database 130 to may occur at step 204. Whereas, identification of a current container database of pluggable database 130 may occur at step 208 or vice versa. Step 204 may occur more or less when administrative request 140 is received. Whereas, step 208 may be deferred until a convenient time to actually fulfill administrative request 140. Either of those times may be appropriate to perform some or all of step 206. For example, accessing hosting metadata 180 may be performed by asynchronous job 170 or by cloud 100 before creating asynchronous job 170 just in time for administrative request 140 to actually be executed.

In step 208, the cloud executes the asynchronous job to configure or reconfigure the pluggable database. For example, cloud 100 may detect that pluggable database 130 and/or current container database 121 may have its memory allocation increased, and so cloud 100 does not need to move pluggable database 130 to another container database. Thus in step 208, asynchronous job 170 may simply adjust pluggable database 130 and/or current container database 121 to reserve more memory.

At any point in the lifecycle of asynchronous job 170, including any of the above steps, asynchronous job 170 may spawn additional administrative requests. For example while fulfilling administrative request 140, asynchronous job 170 may clone a pluggable database 130 by submitting a second administrative request to create a backup of pluggable database 130 from current container database 121, and a third administrative job to restore the backup of pluggable database 130 into target container database 122.

4.0 Autonomous Reconfiguration

FIG. 3 is a block diagram that depicts an example cloud 300, in an embodiment. Cloud 300 has automatic reflexes to dynamically optimize the performance of a topology. In this example, cloud 300 automatically relocates and upgrades a pluggable database E in reaction to a full disk. Cloud 300 may be an implementation of cloud 100.

4.1 Monitor

Cloud 300 contains components 310, 321-322, 330, 360, and 370, each of which may be a computer or a co-locatable software service that shares a computer. Monitor 310 receives telemetry from components of cloud 300, such as measurements and alerts. Monitor 310 may be configured with reflexes, such as rule-based reactions, that: a) in a configurable way, detect environmental conditions such as alerts, threshold crossings, and other conditions; b) make configurable decisions on how to react; and c) emit administrative requests to execute its decisions.

Disk full A may be an alert that a disk is already full, or that the disk is nearly full according to a crossed threshold, such as when container database (CDB) 321 has a busy period that generates an immense audit log. In reaction to disk full A, monitor 310 may decide to: a) switch to using a storage area network (SAN) for some files such as audit files, b) move the container database (and its pluggable databases) to a point of delivery (PoD) that has a bigger disk, or c) evict some pluggable database(s) from the container database. As shown, monitor 310 decides to evict pluggable database E from CDB 321 by generating request B.

4.2 Upgrade/Downgrade

Execution of request B entails interrogation of hosting repository 360 that answers by announcing prior and next hosting C that indicates that pluggable database E should be moved into CDB 322. Prior and next hosting C also indicates a software version mismatch, for which worker 370 should apply a software upgrade (or downgrade) to pluggable database E during the move. Each of CDBs 321-322 has a tall stack of system and application software layers, and each software layer has its own lifecycle of releases and patches. Thus, a version mismatch may involve one, some, or all of container database DBMS, PoD framework, bytecode interpreter, virtualization middleware, operating system, or other installed software infrastructure.

Worker 370 may use prior and next hosting C to detect a version mismatch and execute migration scripts to migrate pluggable database E to a target release. Migration scripts may include artifacts such as shell scripts, python scripts, native executables, stored procedures, and other structured query language (SQL) such as data definition language (DDL) or data manipulation language (DML). Migration scripts may adjust artifacts such as schemas, table content, and files. Some migration scripts may run to prepare pluggable database E for relocation. Other migration scripts may run to prepare target CDB 322 to host pluggable database E. Still other migration scripts may make adjustments to pluggable database E after moving pluggable database E into CDB 322.

Architecture and techniques for implementing and operating an Autonomous Multitenant Database Cloud Service Framework are presented in related U.S. application Ser. No. 16/055,468.

5.0 Example Autonomous Database Cloud

Figure 4:
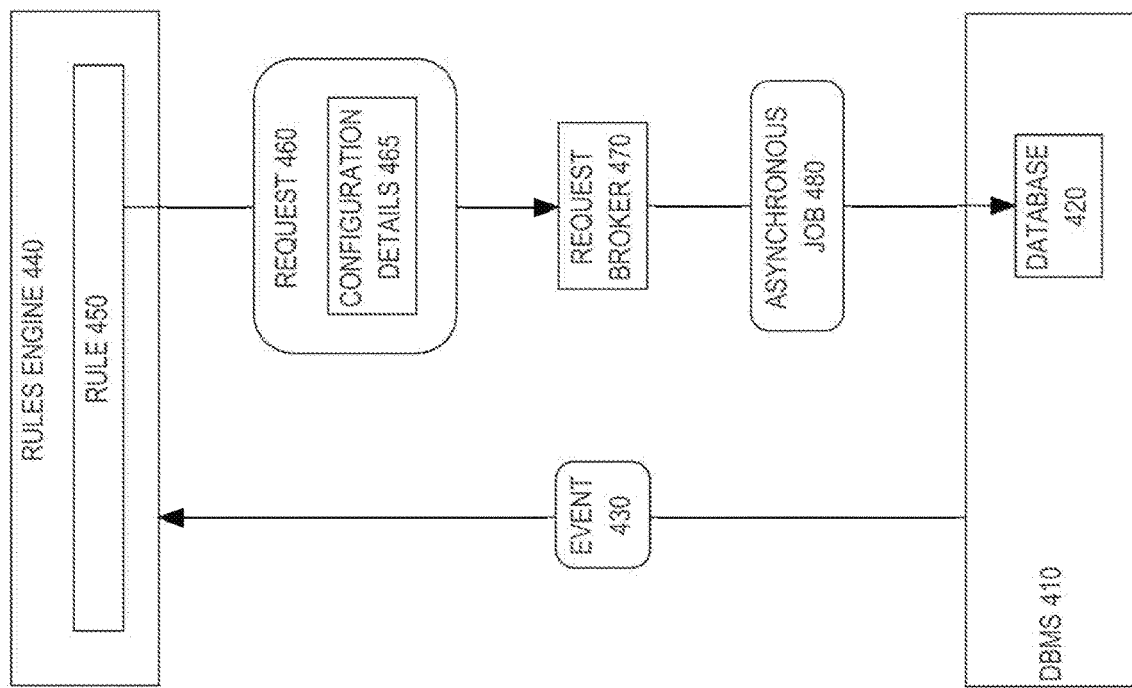
FIG. 4 is a block diagram that depicts an example cloud that has a rules engine that reacts to a database system event by autonomously submitting an asynchronous job to reconfigure a database, in an embodiment.

FIG. 4 is a block diagram that depicts an example cloud 400, in an embodiment. Cloud 400 has a rules engine that reacts to a database system event by autonomously submitting an asynchronous job to reconfigure a database. Cloud 400 may be an implementation of cloud 100. Cloud 400 includes DBMSs such as 410, rules engine 440, and request broker 470, which may be any implementation of WebLogic broker 630 of FIG. 6 of related U.S. application Ser. No. 16/055,468. DBMS 410 contains databases such as 420, which may be a relational database, a NoSQL database, or other managed database.

5.1 Database System Events

Operating conditions for DBMS 410 may dynamically fluctuate, such as disk space, processing load, or query mix. DBMS 410 may be configured with thresholds and other triggers that detect significant changes in operating conditions. For example, unused disk space may decrease below a threshold percentage or absolute amount. In response to a significant change in an operating condition, DBMS 410 may emit an event such as 430 to announce such a change for a given pluggable database, container database, or DBMS 410 itself. For example, DBMS 410 may send a JMS message or an operating system signal to deliver event 430 to other software program(s). Thus, operating conditions of DBMS 410 may be readily visible to other software according to a series of emitted events.

5.2 Event Categories

Event 430 may represent a collection of attributes that may be inspected to determine whether or not a significant condition is occurring. In an embodiment, an event broker handles events delivery to the subscribers. Each event subscription consists of an event type and an event subscriber. Events may be broadly classified into categories such as operations, monitors, and SQL-related.

Operation events indicate state transitions within a lifecycle of a database. An operation event may indicate, for a particular database, at least one of: provisioning, un-provisioning, relocation, cloning and/or horizontal scaling, refreshing, backing up, restoring, upgrading, patching, registering, or unregistering.

Monitor events indicate the performance status of a database. A monitor event may indicate performance metrics for SQL commands in general or vital statistics such as measured during a health check.

SQL-related events indicate statistics for a particular clause, predicate, or whole or partial statement. A statement may be DDL or DML such as a query. For example, an SQL event may indicate that a particular predicate is shared by different queries, which may imply that the predicate is a candidate for materialization as a virtual column.

5.3 Rules Engine

Rules engine 440 may receive events such as 430 to monitor the status of DBMSs such as 410. For example, rules engine 440 may subscribe to events the DBMS 410 publishes according to a publish/subscribe framework. Between rules engine 440 and DBMS 410 may be an event bus, queue, or broker (not shown) that may provide functionality such as buffering, persistence, reliability, and decoupling such that DBMS 410 and rules engine 440 need not directly interface with each other.

Rules engine 440 may be an inference engine that loads and applies rules such as 450 to achieve customizable behavior. For example, rules engine 440 may load rule 450 as data that may be compiled or interpreted to extend the behavior of rules engine 440. For example, rule 450 may be text that conforms to a grammar for encoding which events can match the rule and what action to take when a match occurs. A plurality of rules may be loaded to configure rules engine 440 to associate particular behavioral reactions to particular operational conditions that events may indicate. For example, rule 450 may specify that database 420 should be moved to a different computer when event 430 indicates that free disk space falls below one gigabyte.

5.4 Rules

However, rules engine 440 does not directly execute an action specified by a rule that matches event 430. Instead, rule 450 generates and sends request 460 to cause submission of asynchronous job 480 as follows. Rule 450 may emit configuration details 465, within request 460, to directly or indirectly specify configuration adjustments for a database such as 420. Configuration details 465 may identify database 420 as a reconfiguration target.

Rule 450 may send request 460 to request broker 470, such as by using a REST request to send JSON, XML, or other CGI data over HTTP. In an embodiment, request 460 includes an executable script such as JavaScript, SQL, python, or a shell script, for execution by asynchronous job 480. Based on request 460 and configuration details 465, request broker 470 may create asynchronous job 480 whose execution may be deferred, for example according to the swim lanes, thread pools, and queues of FIG. 6 of related U.S. application Ser. No. 16/055,468. Asynchronous job 480 eventually executes, which includes reconfiguring database 420 according to configuration details 465. Thus, rules engine 440 may autonomously manage databases such as 420 according to changing operating conditions of DBMSs such as 410. Thus, rules engine 440 provides a central repository of autonomous behaviors needed to maintain the databases of cloud 400.

6.0 Example Autonomous Administration Process

Figure 5:
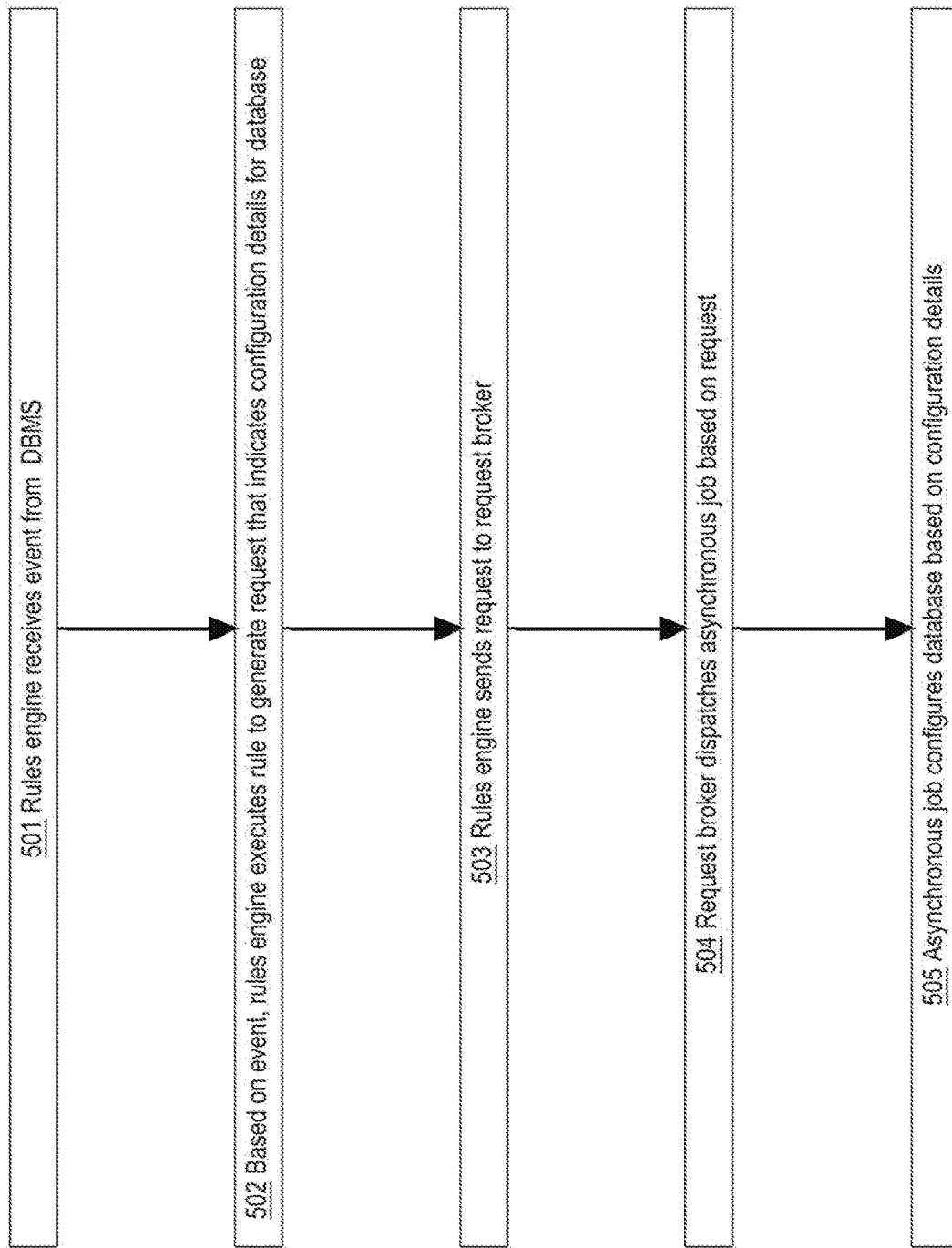
FIG. 5 is a flow diagram that depicts an example autonomous process that uses a rules engine that reacts to a database system event by submitting an asynchronous job to reconfigure a database, in an embodiment.

FIG. 5 is a flow diagram that depicts an example autonomous process that uses a rules engine that reacts to a database system event by submitting an asynchronous job to reconfigure a database, in an embodiment. FIG. 5 is discussed with reference to FIG. 4.

6.1 Stimulus

In step 501, a rules engine receives an event from a DBMS. In an embodiment, DBMS 410 directly sends event 430 to rules engine 440. In an embodiment, DBMS 410 and rules engine 440 are hosted by separate computers or operating system processes, and event 430 is directly delivered according to a remoting protocol such as HTTP, REST, simple object access protocol (SOAP), and/or remote procedure call (RPC). In an embodiment, DBMS 410 indirectly sends event 430. For example, an enterprise service bus (ESB), message queue (MQ), or other broker mediates, relays, and/or buffers event 430 for ultimate delivery to rules engine 440. In an embodiment, rules engine 440 is embedded within an operating system process and address space of DBMS 410, such that event 430 may be delivered during a subroutine invocation.

Some events may indicate at least one of: an execution statistic of different queries such as average response time, an execution statistic of data manipulation language (DML) writes, an execution statistic of data definition language (DDL) commands, an execution statistic of a particular query, a result of an integrity check of a database, usage of a resource for a database in excess of a threshold, or availability of a resource for a database below a threshold.

6.2 Reaction

In step 502 and based on the event, the rules engine executes a rule to generate a request that indicates configuration details for a database. For example, event 430 matches rule 450 that generates request 460 and configuration details 465 for database 420. For example, configuration details 465 may specify that database 420 should be horizontally scaled by cloning/replicating onto additional computers. In an embodiment, configuration details 465 may specify adjusting at least one DBMS tuning parameter of: a maximum count of open database cursors, a maximum count of connection sessions, a maximum size of a memory store of session-dependent variables, a maximum size of a memory store of session-independent variables, or an amount of parallelism (e.g. CPU cores) for processing a query. Configuration details 465 may also have other adjustable attributes for DBMS tuning such as size, quantity, and host of transaction logs, checkpoint interval for recovery, size of execution plan cache (a.k.a. procedure cache), size, keys, and hosts of data partitions, column indexing or encoding, size of query cache, size of row cache, size of data block cache, transaction lock granularity, log buffer size, log flush frequency or granularity, view materialization, index rebuilding, index data structure, schema denormalization, amount of replication, and cache victim strategy. Configuration details 465 may also have adjustable attributes for tablespace tuning such as size and quantity, amount of memory, undo tablespace size, extent size, and prefetch size. As discussed later herein, a templating mechanism may generate request 460 and/or configuration details 465.

In step 503, the rules engine sends the request to a request broker. For example, rules engine 440 may send request 460 to request broker 470. Examples of sending a request to a request broker are discussed for FIGS. 4-6 of related U.S. application Ser. No. 16/055,468 therein. Ideally, request broker 470 initially buffers or minimally processes request 460 so that a demand spike of inbound requests can be rapidly absorbed and not cause network backpressure to rules engine 440 or interactive users such as DBAs. For example, some processing related to intake of request 460 may or may not be deferred until next step 504.

In step 504, the request broker creates and dispatches an asynchronous job based on the request. For example, request broker 470 may generate asynchronous job 480 based on configuration details 465. In some embodiments, asynchronous job 480 may be a logic script, such as python or JavaScript, or a Java job such as at least one of: a Runnable, a Callable, or a Future as defined by the java.util.concurrent package. Execution of asynchronous job 480 may be deferred until a scheduled time, such as a temporal maintenance window, until execution resources become available, such as a pooled thread, or until transactional load of database 420 opportunistically falls below a threshold.

In step 505, the asynchronous job configures the database based on the configuration details. For example, asynchronous job 480 eventually executes, which reconfigures database 420 according to configuration details 465. For example, asynchronous job 480 may invoke stored procedures of database 420 to cause reconfiguration.

6.3 Chain Reaction

Asynchronous job 480 may perform various post processing after execution, such as assessing system status and conditions of DBMS 410 and/or database 420, which may cause additional event(s) to be sent to rules engine 440. For example, asynchronous job 480 may create database 420, which causes an event that indicates how much free disk space remains on a local drive, which may or may not cause other rules to fire (i.e. be applied). Asynchronous job 480 may send an event that indicates successful or unsuccessful completion of asynchronous job 480, which may or may not cause other rules to fire.

For example after asynchronous job 480 configures database 420, asynchronous job 480 may initiate a database health check that generates an additional event that indicates at least one of: an execution statistic of different queries, an execution statistic of DML writes, an execution statistic of DDL commands, an execution statistic of a particular query, a result of an integrity check of the database, usage of a resource for the database exceeds a threshold, or a threshold exceeds availability of a resource for the database. Realtime telemetry techniques for automatically monitoring remote system health are presented in related U.S. Pat. No. 9,692,819.

7.0 Machine Learning

Figure 6:
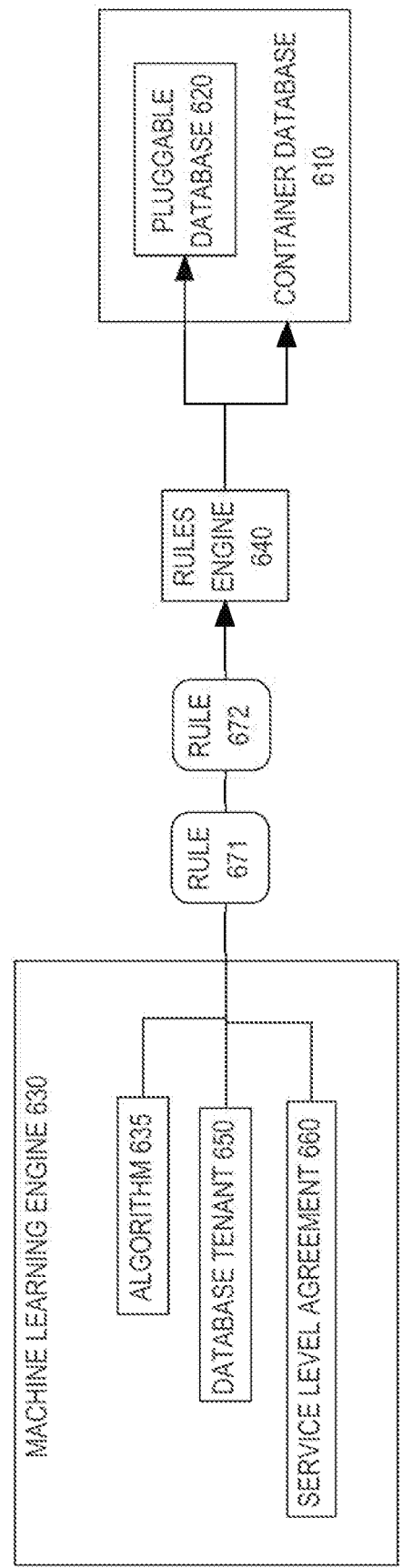
FIG. 6 is a block diagram that depicts an example cloud that uses machine learning to automatically tune rules for optimal management of container databases and their pluggable databases, in an embodiment.

FIG. 6 is a block diagram that depicts an example cloud 600, in an embodiment.

Cloud 600 uses machine learning to automatically tune rules for optimal management of container databases and their pluggable databases. Cloud 600 may be an implementation of cloud 100. Cloud 600 includes machine learning engine 630, rules engine 640, and container databases such as 610.

7.1 Optimization Algorithms

Machine learning engine 630 contains optimization algorithm 635 that uses adaptive tuning to generate improved rules, such as 671-672. Algorithm 635 may be at least one of: nearest neighbor, artificial neural network, linear regression, or logistic regression. Algorithm 635 may generate rules that are custom tuned for a particular cloud customer, such as database tenant 650, and/or a particular service level agreement (SLA) such as 660. For example for a deluxe tenant, machine learning engine 630 may generate rules that treat pluggable database 620 as elastic and that replicate pluggable database 620 to other container databases during times of high demand. Whereas for an economy tenant, machine learning engine 630 may generate rules that merely reserve more disk space during high demand to accommodate a larger redo log.

Although not shown, machine learning engine 630 may periodically or continuously receive facts, measurements, and statistics from cloud 600 and/or databases 610 and 620 for use as training inputs for algorithm 635, as discussed later herein. Thus, machine learning engine 630 may periodically or continuously regenerate rules, such as 671-672, that may be sent to rules engine 640 to supplement or replace other rules that rules 640 previously loaded. Thus, rules engine 640 may have an evolving rule base that improves according to deep learning and training of algorithm 635. Thus, as more facts and measurements are provided to machine learning engine 630, the better will be the configuration of databases of cloud 600 according to the ever-improving rules generated by training algorithm 635.

7.2 Rules API

Rules engine 640 may have many rules including some that are handcrafted and others that are automatically generated. Thus, management of the rules base of rules engine 640 may be more or less complicated. Rules engine 640 may have an application programming interface (API) for rules management automation. For example, the rules API may support operations such as create, read, update, and delete (CRUD) of generated and/or handcrafted rules. The rules API may have an operation for injecting an event into rules engine 640 for rules processing.

The rules API may be implemented as remote procedure calls (RPC), web services such as REST and/or common gateway interface (CGI) post, stored procedures, or other interface protocol.

8.0 Training

Figure 7:
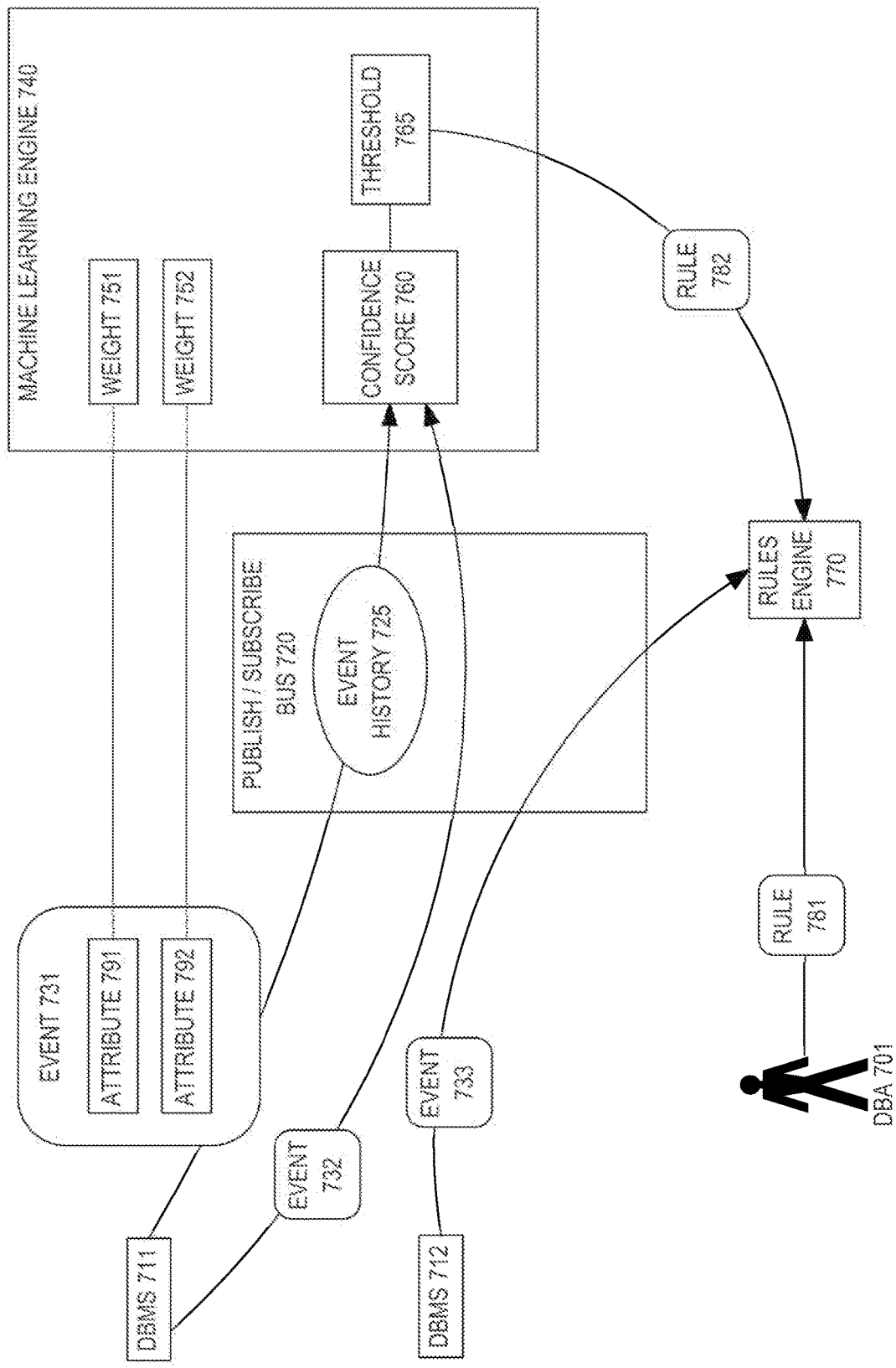
FIG. 7 is a block diagram that depicts an example cloud that trains with historical events to improve rules, in an embodiment.

FIG. 7 is a block diagram that depicts an example cloud 700, in an embodiment. Cloud 700 trains with historical events to improve rules. Cloud 700 may be an implementation of cloud 100. Cloud 700 includes machine learning engine 740, rules engine 770, publish-subscribe bus 720, and DBMSs such as 711-712.

8.1 Event Delivery

DBMSs 711-712 emit events such as 731-733. However, events are not directly delivered to consumers, such as rules engine 770 and machine learning engine 740. Instead, events are mediated by publish-subscribe bus 720 that relays events to interested consumer(s). Publish-subscribe bus 720 may be an enterprise service bus (ESB), a publish-subscribe broker, or other form of event queue. In an embodiment, events are categorized by topics that are dedicated to event sources or event types, such as per pluggable database, per container database, per customer, or otherwise. Interested consumers, such as engines 740 and 770, may subscribe to interesting topics to receive relevant events. In an embodiment, each customer has a dedicated rules engine such as 770 that subscribes with publish-subscribe bus 720 to a customer-specific event topic.

Publish-subscribe bus 720 may merely relay an event to subscriber(s). For example, event 733 is relayed without additional mediation to rules engine 770, which may match a rule of rules engine 770 that spawns asynchronous job(s). Publish-subscribe bus 720 may also durably record events into event history 725. In an embodiment, event history 725 is a database of recorded events. For example, a relational table of events may have columns that indicate the source and nature of each event, such as by identifying any of: customer, pluggable database, container database, event type, event parameters, or timestamp.

8.2 History Replay

An event consumer such as machine learning engine 740 may subscribe to publish-subscribe bus 720 for live events or retrieval of events already recorded in event history 725. For example, event 731 may be retrieved from event history 725 for training machine learning engine 740. Live events such as 732-733 can be relayed more or less in real time to consumers such as engines 740 and 770, with or without recording them into event history 725 as they pass through publish-subscribe bus 720. Thus, machine learning engine 740 may be bulk trained based on a large batch of events from event history 725 or spontaneously and incrementally tuned based on a stream of live events.

8.3 Weighted Attributes

Each event, such as 731, may have attributes, such as 791-792, that indicate separate operating conditions that existed when the event was generated. For example, attribute 791 may indicate backlog depth, such as according to a size of a redo log. Attribute 792 may indicate CPU load, time of day, event type, or event source, for example. Other events may have the same or other attributes. Some attributes may be more significant than others. Machine learning engine 740 has weights 751-752 that scale the values of respective attributes 791-792 according to significance. Thus, a multiplicative product of the values of attribute 791 and weight 751 may yield a scaled attribute value, which may be injected as input into a learning algorithm during training. Weights 751-752 may be adjustable. For example, training may optimize weights 751-752.

8.4 Training Confidence

The accuracy of an already trained algorithm may depend on how much training occurred. Thus, the more events are consumed during training, the more fit will be rules, such as 782, that are generated by machine learning engine 740. Machine learning engine 740 has confidence score 760 that increases as machine learning engine 740 consumes events during training. In an embodiment, training is complete when confidence score 760 exceeds threshold 765. In another embodiment, training is complete when machine learning engine 740 has consumed all training events and an iterative learning algorithm converges.

8.5 Retraining

Threshold 765 may also be used for retraining, where machine learning engine 740 consumes additional events for additional tuning, such as additional optimization of weights 751-752. Retraining finishes when confidence score 760 exceeds threshold 765, which may have a different value than for initial training. Each time retraining begins, confidence score 760 may be reduced or reset to zero and/or threshold 765 may be increased. In an embodiment, retraining is continuous and occurs when each new event arrives.

8.6 Retention Priority

When training or retraining finishes, machine learning engine 740 regenerates rules, such as 782. Rules engine 770 may obtain and load regenerated rules. Loading of subsequent rules may supplement or replace previously loaded rules. A client application or human user such as DBA 701 may load handcrafted rules, such as 781, into rules engine 770. Thus, rules engine 770 may have a mix of rules of manual and automatic origin. Handcrafted rules may be given tenure within rules engine 770, such that handcrafted rule 781 is replaced by generated rule 782 only if confidence score 760 exceeds a threshold, such as 765.

In an embodiment, machine learning (ML) engine 740 subscribes to all event types for which its rule recommendation models (ML models) need for training. Machine learning engine 740 employs various ML techniques, including k-nearest-neighbor, neural networks, and linear regression, to build various rule recommendation models based on a list of attributes included in the subscribed events. Each rule recommendation model adjusts the weights assigned to different attributes of the subscribed events based on historical events data. Since multiple tenant databases exist in the system, machine learning engine 740 performs cross-tenant analysis of events data to improve its model confidence. The models' confidence scores improve over time as the amount of analyzed events increases. The recommended rule consists of condition and action/job as explained above. The recommended job can be either a self-tuning job or self-maintenance job.

In an embodiment, each database tenant in cloud 700 can specify the following two confidence score thresholds. That includes a base confidence threshold, such that once the confidence score of the rule recommendation models exceeds this threshold, machined rules are generated and posted into rules engine 770. Machined rules are updated as the confidence improves over time. That also includes an override confidence threshold, which in case of conflicts between machined rules and handcrafted rules, machined rules will override handcrafted rules only if its confidence exceeds the override confidence threshold.

8.7 Example Technology Stack

The following is a particular embodiment that may be an implementation of any of the clouds presented herein. This embodiment is tailored for, and discussed with reference to, clouds 400 and 700.

Request broker 470 includes a WebLogic Java-2 enterprise edition (J2EE) application server, which includes a web server that accepts a REST API for request submission and management. The REST API is implemented with SmartBear's Swagger OpenAPI. A client may use CURL or a web browser. Thus, requests may be interactive, scripted, or dynamically generated such as request 460. Asynchronous jobs, such as 480, are implemented with either or both of: Java message service (JMS), and java.util.concurrent Java package (e.g. thread pool, executor, and computational future). Event distribution by publish/subscribe bus 720; is implemented with JMS publish/subscribe message topics, with DBMS(s) such as 711-712 as publishers and rules engine 770 as a subscriber. Rules engine 770 is implemented with Mustache template engine. Templating is discussed further for FIG. 8, later herein. Machine learning engine 740 is implemented with a machine learning library such as Apache Spark MLlib that has canned algorithms such as logistic regression.

This particular embodiment has the following benefits. This embodiment is horizontally scalable for: a) symmetric multiprocessing (SMP) such as multicore, and/or b) distributed computing such as cluster or cloud computing. This embodiment needs only one codebase (e.g. pure Java) for heterogeneous computing (e.g. wide area network, WAN).

9.0 Rules Interference

Figure 8:
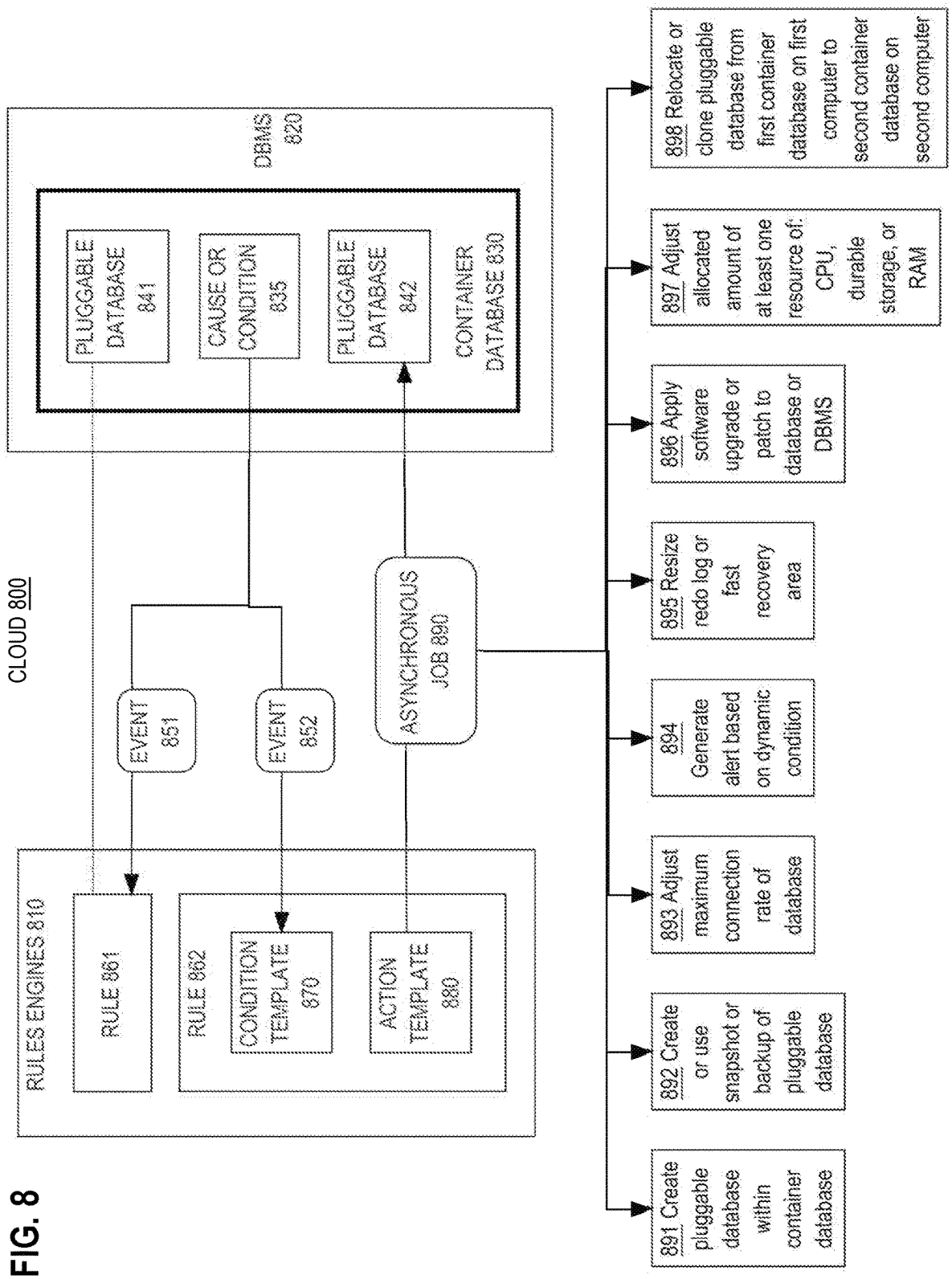
FIG. 8 is a block diagram that depicts an example cloud that avoids interference between rules, in an embodiment.

FIG. 8 is a block diagram that depicts an example cloud 800, in an embodiment. Cloud 800 avoids interference between rules. Cloud 800 may be an implementation of cloud 100. Cloud 800 includes rules engines 810, and DBMSs such as 820.

Cloud 800 does not expect an individual rule, such as 861-862, to cause a reconfiguration that is globally optimal for cloud 800. Instead, each of rules 861-862 may recognize a particular condition, such as 835, that is inconvenient for a particular pluggable database, such as 841-842, or tenant. Likewise when an individual rule, such as 861-862, is applied, the rule causes a particular action that is beneficial for the pluggable database or tenant, but not necessarily beneficial for cloud 800 as a whole.

9.1 Condition Recognition

For example, cause or condition 835 may be exhaustion of storage capacity of a disk that is local to container database 830 and shared by pluggable databases 841-842. DBMS 820 may detect that the disk is more or less full and emit one event or redundant events, such as 851-852, that indicate the full disk. In an embodiment, events 851-852 are generated for respective pluggable databases 841-842 for a same occurrence of cause or condition 835. In an embodiment, each of pluggable databases 841-842 has its own separate set of rules in a shared or respective rules engines 810. For example, rules 861-862 may be more or less similar but associated with respective pluggable databases 841-842. In an embodiment not shown, rules 861-862 reside in separate rules engines because rules 861-862 are associated with separate tenants.

In various embodiments, rules engines 810 may be a single rules engine that is shared by any of: a) some or all pluggable databases of one container database, b) some or all container databases and pluggable databases of a same DBMS, c) some or all container databases and pluggable databases of multiple DBMSs (not shown), or d) some or all container databases and pluggable databases of some or all tenants (e.g. customers and/or applications). Even when separate pluggable databases have separate sets of rules, those sets of rules may be consolidated into a combined monolithic rules base for use in one or more rules engines. For example, each of rules 861-862 may be maintained in separate sets of rules for separate pluggable databases 841-842 and then combined into a monolithic rules base for loading into a same rules engine. In such a case, some embodiments may generate only one (not two as shown) event from cause or condition 835, and that single event may trigger either or both of rules 861-862.

In an embodiment, rules engines 810 may be replicated (i.e. horizontally scaled) such that any event may be delivered to any replica of the rules engine and still fire (i.e. apply) a same rule for a same pluggable database. In replicated embodiments and depending on the implementation, pluggable database 841 may or may not be pinned to a particular instance of rules engines 810. For example, pluggable database 841 may be previously managed by one rules engine instance and subsequently managed by another rules engine instance that has the same rules. In an embodiment, horizontal scaling of rules engines 810 may be elastic, such as for reconfiguration demand spikes, such as during an operational emergency that simultaneously impacts many pluggable databases.

Each of rules 861-862 has a condition template, such as 870, that does or does not match a current event, such as 852. For example, conditional template 870 may encode predicate logic or other filter expression that may or may not be satisfied by attributes of event 852. For example, rule 862 may require a gigabyte of free local diskspace, such that condition template 870 is satisfied when event 852 indicates that free space does not exceed a gigabyte.

9.2 Templating

When condition template 870 is satisfied, rule 862 is applied by applying action template 880. For example, action template 880 may generate a configuration descriptor from which asynchronous job 890 may be constructed and submitted for eventual execution. In an embodiment, either or both of templates 870 and 880 are textual. In an embodiment, the generated configuration descriptor appears as templatized text within action template 880, thereby achieving what you see is what you get (WYSIWIG) generation of configuration descriptors. In an embodiment, textual templates are aggregated into a templating engine such as Mustache or Java server pages (JSP). In an embodiment event 852 is delivered to one of rules engines 810 using HTTP such as a CGI post.

9.3 Holistic Efficiency

Thus as described above, cause or condition 835 may be a full disk that is indicated by events 851-852 that triggers rules 861-862. Thus, the action templates of both rules 861-862 may execute in response to a same full disk. For example, rules 861-862 may both submit asynchronous jobs such as 890 that cause each respective pluggable database 841-842 to move out of container database 830 and into a different container database that has more local disk space. Indeed, both pluggable databases 841-842 deciding by rule to leave container database 830 can solve the problem of low disk space. However, moving both pluggable databases 841-842 may be globally suboptimal. For example, time and energy may be saved by instead moving only one of the two pluggable databases 841-842. Such suboptimality caused by interference of contentious rules may be avoided in various embodiments as follows. Interference between rules may be exacerbated by having multiple tenants and/or rules that manage different pluggable databases, databases of different scopes (e.g. container and pluggable databases), or databases of different tenants and/or applications.

In an embodiment, interference is avoided by the asynchronous jobs themselves, such as 890. For example, rules 861 may spawn an asynchronous job (not shown) that evicts pluggable database 841 from container database 830, thereby deallocating some local disk space, thereby curing cause or condition 835 that ceases. Eventually asynchronous job 890 executes, and it may detect whether various preconditions are satisfied and abort or reschedule if not satisfied. Asynchronous job 890 may detect whether local disk space has or has not yet become sufficient. If disk space is sufficient, asynchronous job 890 may terminate prematurely, thereby leaving pluggable database 842 to remain within container database 830. In an embodiment, asynchronous job 890 may evaluate its preconditions by re-invoking condition template 870.

In an embodiment, the asynchronous job from rule 861 may execute normally (i.e. evict pluggable database 841) and then cause another event to be sent to rules engines 810 that indicates ample local disk space. That additional event may cause rules engines 810 by rule or otherwise to cancel asynchronous job 890 as no longer needed.

In an embodiment, rules engines 810 do not consume event 852 until after pluggable database 841 is evicted, in which case condition template 870 will not be satisfied when event 852 is eventually processed. Thus, action template 880 would not be applied, and asynchronous job 890 would not be created. Which of rules 861-862 is evaluated before the other depends on the embodiment. In an embodiment, events 851-852 are processed in a same order as they arrive at rules engines 810. In an embodiment, rules, pluggable databases, and tenants may each be assigned a rank or priority. In an embodiment, rules associated with high priority are evaluated first to avoid priority inversion that would cause a high priority database to detrimentally wait for a low priority database to react. In an embodiment, rules associated with low priority are evaluated first, and quality of service is temporarily degraded for a low priority database while that database is, for example, evicted, thereby minimizing maintenance-related service degradation for high priority databases.

In an embodiment, container database 830 may have its own rules (not shown) in rules engines 810. In an embodiment, rules of container database 830 may have high priority and execute before rules of pluggable databases 841-842, thereby facilitating central coordination of multiple pluggable databases 841-842. For example, a rule of container database 830 may react to disk exhaustion by selecting and evicting pluggable database 841, thereby centrally resolving the problem and obviating the need to apply rules 861-862 that otherwise may cause a coordination problem such as a race condition that yields suboptimal results as discussed above.

In an embodiment, pluggable databases and/or container database may each have a more or less uniform lifecycle with formalized operational states that correspond to typical phases of important maintenance scenarios. For example, a pluggable database may be in a transitional state that represents a reconfiguration activity such as scaling up, scaling down, or relocating. In an (e.g. Java or C) embodiment, one or more enumerations declare the states of one or more lifecycles. Rules templates such as 870 and 880 may inspect the operational state of one or more pluggable databases. For example, rule 862 for pluggable database 842 may: a) detect that other pluggable database 841 is currently being evicted (i.e. relocated), and b) decline to fire because the ongoing relocation may soon cure a shared problem of disk exhaustion. In some embodiments, if a rule declines to fire due to a detected transitional state, then at a later time (e.g. scheduled or upon subsequent change of transitional state), the declining rule may be reevaluated, and/or the original event may be reprocessed by the rules engine. Thus, the rules of multiple pluggable databases may achieve some degree of coordination to achieve a globally optimal result.

9.4 Example Administration and Maintenance Tasks

Asynchronous job 890 may perform a variety of database administration tasks such as one or more of 891-898. In an embodiment, any of tasks 891-898 are implemented by stored procedure calls within databases such as 830 and 841-842, which may be invoked by asynchronous job 890. In an embodiment, any of tasks 891-898 are hard coded into the codebase or script of asynchronous job 890.

Task 891 creates a pluggable database, such as 841-842, within container database 830. Pluggable database creation may be templatized, such that a prototype pluggable database may be cloned into container databases such as 830 to create pluggable database instances, such as 841-842. Rules based techniques for using a central repository to automatically provision pluggable databases are presented in related U.S. patent Ser. No. 15/266,902.

Task 892 creates or uses a snapshot or backup of a database such as 830 or 841-842. Database snapshots are widely used to quickly create point-in-time virtual copies of data. A database backup protects against storage media failures. A backup or snapshot is used (consumed) during database restoration or recovery. Automatic backup techniques for pluggable databases are presented in related U.S. application Ser. No. 15/254,884.

Task 893 adjusts a maximum rate at which new sessions can be connected to a database such as 830 or 841-842. That can mitigate a login storm, such as during a denial of service (DOS) attack.

Task 894 generate an alert or event based on a dynamic condition. For example, asynchronous job 890 may consume disk space to create a column index and then generate an event, such as 851, to indicate how much free disk space remains. That may cause a rule, such as 861, to be applied.

Task 895 resizes a redo log or a fast recovery area. For example, a redo log may expand to accommodate more in-flight transactions, such as during a demand spike.

Task 896 applies a software upgrade or patch to a database, such as 830 or 841-842, or to a DBMS such as 820. A patch may create or modify files containing logic or data, may execute shell or DDL or DML scripts, and/or may invoke stored procedures. Techniques for automatic relocation of a pluggable database from one container database to another are presented in related U.S. Pat. No. 9,396,220 and U.S. patent application Ser. No. 15/215,446. Techniques for automatic upgrade of pluggable databases are presented in related U.S. application Ser. No. 15/266,917.

Task 897 adjusts an amount allocated to a database, such as 830 or 841-842, of at least one resource such as CPU, durable storage, or RAM. For example, a volatile cache of disk blocks may be expanded during a demand spike. Task 897 may also affect a temporary allocation, such as for a particular duration or until a particular condition, after which the resource allocation reverts to a previous amount.

Task 898 relocates or clones a pluggable database from a first container database on a first computer to a second container database on a same or different computer. For example, asynchronous job 890 may allocate more processing cores to pluggable database 841 in excess of available cores of container database 830. Thus, asynchronous job 890 may also move one of pluggable databases 841-842 to a different container database on a different computer. Techniques for cloning a pluggable database are presented in related U.S. patent application Ser. No. 15/215,435.

10.0 Example Autonomous Tuning Process

Figure 9:
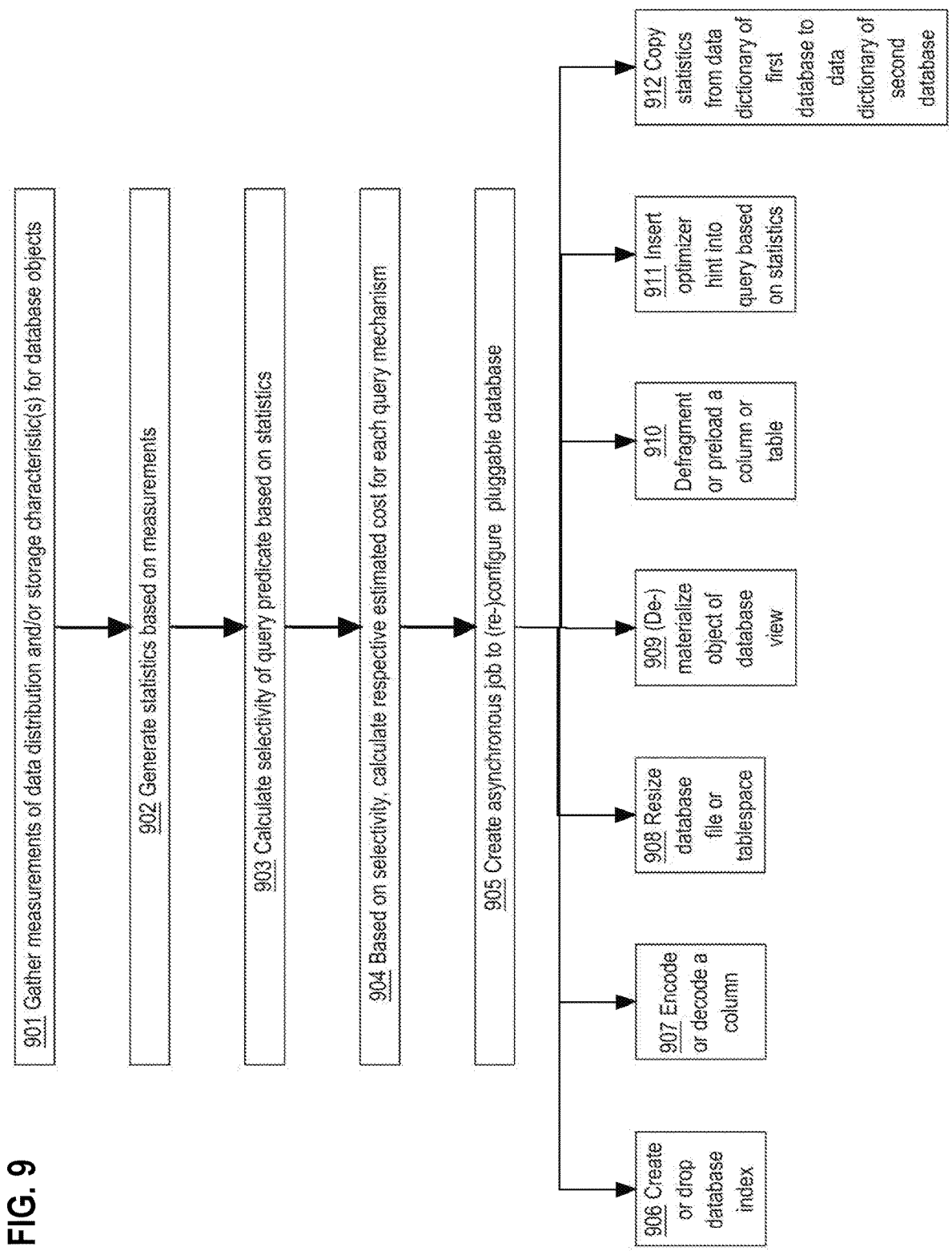
FIG. 9 is a flow diagram that depicts an example database tuning process for faster query execution, in an embodiment.

FIG. 9 is a flow diagram that depicts an example database tuning process for faster query execution, in an embodiment. FIG. 9 is discussed with reference to FIG. 8.

10.1 Statistics

Steps 901-903 are preparatory. They collect and analyze statistics needed to decide how to tune a database for better query performance. In step 901, measurements of data distribution and/or storage characteristic(s) for database objects are gathered. For example, DBMS 820 may monitor and record resource usage and/or data patterns that are associated with query statements, query expressions, tables, partitions, and/or columns.

In step 902, statistics are generated based on the measurements. For example, a histogram of values of a column or expression may be generated. A heatmap based on CPU, memory, or I/O usage of a query expression or storage artifact (e.g. column or table) may be generated. Data correlations between columns or expressions may be detected.

10.2 Predicate Selectivity

In step 903, selectivity of a query predicate is calculated based on the statistics. Selectivity facilitates more or less accurate estimations of result set size and ratio of result set row count to source table row count, which improves query planning during query processing. Selectivity is especially helpful for reordering of cascaded joins or cascaded filter terms to aggressively prune intermediate results. For example, filtering first on a column having more distinct values may be more efficient than filtering first on a column having fewer distinct values, even though both columns need filtration.

Step 904 analyzes a subset of potential steps 906-912 as a course of action. Each of potential steps 906-912 is a particular reconfiguration technique for a database that may improve future query performance. Each potential reconfiguration incurs a respective expected cost of reconfiguring and may yield a respective expected acceleration. Reconfiguration cost may be based on temporary resource consumption (e.g. CPU, I/O, memory) during the reconfiguration and temporary service degradation during the reconfiguration. Background reconfiguration may cost less than reconfiguration that temporarily locks a database object. For example, the cost of creating a column index (906) may be higher than the cost of inserting an optimizer hint into a query (911). Whereas, a column index may be expected to accelerate a query more than an optimizer hint, which may depend on the data access methods involved, such as table scanning versus index traversal. In step 904, a respective estimated cost for each of alternative database optimization mechanisms is calculated based on the calculated selectivity.

10.3 Cost-Benefit Analysis

Step 905 is decisional. One (or more if compatible) potential optimization of 906-912 is selected according to cost-benefit analysis. In an embodiment, any of steps 904-905 (and 906-912) may be implemented as rules for rules engines 810. For example, cause or condition 835 may occur when a particular query, expression, table, or column is repeatedly used in excess of a threshold. For example, event 852 may indicate that a certain column has become hot in a usage heat map. Thus, step 904 may be triggered when condition template 870 recognizes that the hot column satisfies various criteria. In step 905, one or more of potential steps 906-912 are selected and consolidated or not into one or more asynchronous jobs. Thus, cloud 800 may autonomously optimize pluggable database 841 or 842 for any or all queries.

10.4 Example Tuning Scenarios

In particular, step 906 creates or drops a database index that is based on one or more columns of a table. Step 907, encodes or unencodes a column, such as with dictionary or other compression. Step 908 resizes a tablespace or database file, such as by adding spare data blocks. Step 909 materializes or dematerializes a database view or a virtual column. Step 910 may defragment a column or table or preload (prefetch) a column or table into RAM. For example, a column or table may be preloaded into a cache or loaded and pinned in memory such as a heap. Step 911 may reserve an optimizer hint for repeated insertion into subsequent queries. Step 912 may propagate an optimization (or statistics that caused an optimization) from one data dictionary to another. Thus, an optimization may be dispersed to replicas or shards and facilitate elastic scaling without human intervention. Techniques for automatically propagating changes between pluggable databases are presented in related U.S. application Ser. Nos. 15/215,443 and 15/266,030.

Thus, cloud databases may be automatically optimized via tuning jobs generated by rules engine 810 to improve query performance. The following are particular scenarios for feature tuning.

Resource parameters such as Oracle's system global area (SGA), program global area (PGA), sessions, and maximum open cursors may be tuned. The SGA is a read/write memory area that, along with the Oracle background processes, form a database instance. All server processes that execute on behalf of users can read information in the instance SGA. Several processes write to the SGA during database operation. The server and background processes do not reside within the SGA, but exist in a separate memory space. Each database instance has its own SGA. Oracle automatically allocates memory for an SGA at instance startup and reclaims the memory at instance shutdown. The PGA is memory specific to an operating process or thread that is not shared by other processes or threads on the system. Because the PGA is process-specific, it is never allocated in the SGA. The PGA is a memory heap that contains session-dependent variables required by a dedicated or shared server process. The server process allocates memory structures that it requires in the PGA. An analogy for a PGA is a temporary countertop workspace used by a file clerk. In this analogy, the file clerk is the server process doing work on behalf of the customer (client process). The clerk clears a section of the countertop, uses the workspace to store details about the customer request and to sort the folders requested by the customer, and then gives up the space when the work is done. An initialization parameter may set a target maximum size of the instance PGA. Individual PGAs can grow as needed up to this target size.

An asynchronous tuning job may rely on database objects statistics already gathered. A cost-based optimization approach uses statistics to calculate the selectivity of predicates and to estimate the cost of each execution plan. Selectivity is the fraction of rows in a table that the SQL statement's predicate chooses. The optimizer uses the selectivity of a predicate to estimate the cost of a particular access method and to determine the optimal join order. Statistics quantify the data distribution and storage characteristics of tables, columns, indexes, and partitions. The optimizer uses these statistics to estimate how much I/O and memory are required to execute a SQL statement using a particular execution plan. The statistics are stored in the data dictionary, and they can be exported from one database and imported into another (for example, to transfer production statistics to a test system to simulate the real environment, even though the test system may only have small samples of data). Statistics should be gathered on a regular basis to provide the optimizer with information about schema objects. New statistics should be gathered after a schema object's data or structure are modified in ways that make the previous statistics inaccurate. For example, after loading a significant number of rows into a table, new statistics on the number of rows should be collected. After updating data in a table, new statistics on the number of rows need not be collected, although new statistics on the average row length might be needed.

Initialization parameters, such as cursor sharing, may be tuned. A private SQL area holds information about a parsed SQL statement and other session-specific information for processing. When a server process executes SQL or PL/SQL code, the process uses the private SQL area to store bind variable values, query execution state information, and query execution work areas. The private SQL areas for each execution of a statement are not shared and may contain different values and data. A cursor is a name or handle to a specific private SQL area. The cursor contains session-specific state information such as bind variable values and result sets. A cursor is more or less a pointer on the client side to a state on the server side. Because cursors are closely associated with private SQL areas, the terms are sometimes used interchangeably.

Techniques for automatic performance tuning of a relational database are presented in related U.S. Pat. No. 8,903, 801. Techniques for automatic performance analysis of a relational database are presented in related U.S. Pat. No. 8,341,178.

11.0 Database System Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

12.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

13.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 106, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 106. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 106. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 106 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 106, or other non-volatile storage for later execution.

14.0 Software Overview

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 106, includes a kernel or operating system (OS) 1113.

The OS 1113 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 106 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1113 and/or application(s) 1102. The GUI 1115 also serves to display the results of operation from the OS 1113 and application(s) 1102, whereupon the user may supply additional inputs or terminate the session (e.g., log off).

OS 1113 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1113. In this configuration, VMM 1130 acts as a software "cushion" or virtualization layer between the OS 1113 and the bare hardware 1120 of the computer system 1000.

VMM 1130 instantiates and runs one or more virtual machine instances ("guest machines"). Each guest machine comprises a "guest" operating system, such as OS 1113, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

15.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   training a machine learning engine based on a first plurality of past events that were historically generated by one or more database management systems (DBMSs) that include a particular DBMS;
   the machine learning engine generating a first plurality of database rules that includes:
      a first rule to generate a request that indicates database configuration details,
      a second rule that is applicable to a pluggable database, and
      a third rule that is applicable to a container database;
   a rules engine receiving an event from the particular DBMS;
   the rules engine executing, based on the event, said first rule to generate the request that indicates the database configuration details;
   the rules engine sending the request to a request broker;
   the request broker dispatching an asynchronous job based on the request;
   the asynchronous job configuring a database based on the database configuration details;
   retraining the machine learning engine based on a second plurality of past events that are more recent than the first plurality of past events;
   increasing a confidence score based on a count of past events in the second plurality of past events;
   the machine learning engine generating, when the confidence score exceeds a threshold, a second plurality of database rules that replaces the first plurality of database rules.

2. The method of claim 1 wherein:
   the rules engine comprises a template engine;
   executing the first rule to generate the request that indicates the database configuration details comprises the template engine selecting the first rule to generate the request that indicates the database configuration details based on the event;
   generate the request comprises the template engine generates text from a template.

3. The method of claim 1 wherein the event indicates at least one selected from the group consisting of: a result of an integrity check of the database, usage of a resource for the database exceeds a threshold, and a threshold exceeds availability of a resource for the database.

4. The method of claim 1 wherein the request that indicates the database configuration details specifies an amount of processor cores.

5. The method of claim 1 wherein generating the first rule to generate the request that indicates the database configuration details comprises executing a nearest neighbor algorithm.

6. The method of claim 1 wherein:
   the asynchronous job causes cloning the pluggable database into a second container database on a second computer, and
   the request that indicates the database configuration details does not identify: the second computer nor the second container database.

7. The method of claim 1 wherein:
   each past event of the first plurality of past events comprises one or more attributes;
   training the machine learning engine comprises, for each attribute of the one or more attributes, adjusting a weight associated with the attribute.

8. The method of claim 1 wherein said first rule to generate the request that indicates the database configuration details is automatically generated based on a particular database tenant.

9. The method of claim 1 further comprising:
   the rules engine loading the first plurality of database rules and a plurality of manually crafted rules;
   the rules engine loading a subset of the second plurality of database rules, wherein each particular rule of the subset of the second plurality of database rules replaces a corresponding rule selected from the group consisting of:
      the plurality of manually crafted rules when the confidence score exceeds a second threshold, and
      the first plurality of database rules when the confidence score does not exceed the second threshold.

10. The method of claim 1 wherein the database configuration details specify tuning the database for faster query execution.

11. The method of claim 10 wherein the database configuration details specify adjusting at least one amount selected from the group consisting of: a maximum count of open database cursors, a maximum count of connection sessions, a maximum size of a memory store of session-dependent variables, and a maximum size of a memory store of session-independent variables.

12. The method of claim 10 wherein:
the database configuration details specify gathering a plurality of measurements of a data distribution or a storage characteristic for one or more objects of the database comprising at least one database object selected from the group consisting of: a table, a column, an index, a partition, and a query;
the method further comprises generating one or more statistics based on the plurality of measurements.

13. The method of claim 12 further comprising:
calculating a selectivity of a query predicate based on the one or more statistics;
calculating, based on the selectivity, a respective estimated cost for each query mechanism of a plurality of alternate query mechanisms.

14. The method of claim 13 wherein:
the respective estimated cost of a query mechanism is based on an estimated amount of at least one resource selected from the group consisting of: memory, and input/output (I/O);
the query mechanism comprises at least one mechanism selected from the group consisting of: a) a particular access method of a plurality of alternate access methods that include table scanning and index traversal, and b) a particular join ordering of a plurality of alternate join orderings.

15. The method of claim 12 further comprising performing, based on the one or more statistics, at least one activity selected from the group consisting of:
inserting an optimizer hint into a query based on the one or more statistics, creating or dropping a database index,
encoding or unencoding a column,
defragmenting or preloading a column or table,
materializing or dematerializing an object of a database view,
resizing a database file or a tablespace, and
copying the one or more statistics from a data dictionary of the database to a data dictionary of a second database.

16. The method of claim 1 wherein the asynchronous job configuring the database comprises:
the asynchronous job detecting whether a cause of the event has ceased;
the asynchronous job configuring the database only if the cause has not ceased.

17. The method of claim 1 wherein the database is a pluggable database capable of being stored within a container database.

18. The method of claim 17 wherein:
the first plurality of database rules includes a fourth rule that is applicable to a second pluggable database that is stored within a same container database that the pluggable database is stored in;
the event identifies the pluggable database and indicates a cause;
the first rule to generate the request that indicates the database configuration details contains a first action template and a first condition template that matches the cause;
the fourth rule contains a second action template and a second condition template that matches the cause;

the method further comprises:
receiving a second event from the particular DBMS that identifies the second pluggable database and indicates the cause;
applying the second action template based on detecting:
the event and the second event include the cause,
the asynchronous job has finished configuring the pluggable database, and the cause has not ceased.

19. The method of claim 17 wherein the asynchronous job causes resizing of a fast recovery area.

20. The method of claim 1 wherein the first rule to generate the request that indicates the database configuration details specifies, based on a temporal period, adjusting an allocated amount of at least one resource.

21. The method of claim 1 wherein executing the first rule to generate the request that indicates the database configuration details comprises generating a second event that causes a fourth rule to execute.

22. The method of claim 1 wherein the event indicates at least one execution statistic selected from the group consisting of: an execution statistic of different queries, an execution statistic of data manipulation language (DML) writes, an execution statistic of data definition language (DDL) commands, and an execution statistic of a particular query.

23. The method of claim 22 further comprising, after the asynchronous job configures the database, the asynchronous job initiates a database health check that generates a second event that indicates at least one selected from the group consisting of: an execution statistic of different queries, an execution statistic of DML writes, an execution statistic of DDL commands, an execution statistic of a particular query, a result of an integrity check of the database, usage of a resource for the database exceeds a threshold, and a threshold exceeds availability of a resource for the database.

24. The method of claim 1 wherein the request comprises a representational state transfer (REST) request.

25. One or more non-transitory computer-readable media storing instructions that, when executed by one or more processors, cause:
training a machine learning engine based on a first plurality of past events that were historically generated by one or more database management systems (DBMSs) that include a particular DBMS;
the machine learning engine generating a first plurality of database rules that includes:
a first rule to generate a request that indicates database configuration details,
a second rule that is applicable to a pluggable database, and
a third rule that is applicable to a container database;
a rules engine receiving an event from the particular DBMS;
the rules engine executing, based on the event, said first rule to generate the request that indicates the database configuration details;
the rules engine sending the request to a request broker;
the request broker dispatching an asynchronous job based on the request;
the asynchronous job configuring a database based on the database configuration details;
retraining the machine learning engine based on a second plurality of past events that are more recent than the first plurality of past events;
increasing a confidence score based on a count of past events in the second plurality of past events;

the machine learning engine generating, when the confidence score exceeds a threshold, a second plurality of database rules that replaces the first plurality of database rules.

26. The non-transitory computer-readable media of claim 25 wherein:
the database configuration details specify gathering a plurality of measurements of a data distribution or a storage characteristic for one or more objects of the database comprising at least one database object selected from the group consisting of: a table, a column, an index, a partition, and a query;
the instructions, when executed by the one or more processors, further cause generating one or more statistics based on the plurality of measurements.

27. The non-transitory computer-readable media of claim 25 wherein:
the rules engine comprises a template engine;
executing the first rule to generate the request that indicates the database configuration details comprises the template engine selecting the first rule to generate the request that indicates the database configuration details based on the event;
generate the request comprises the template engine generates text from a template.

28. The non-transitory computer-readable media of claim 25 wherein the event indicates at least one selected from the group consisting of: a result of an integrity check of the database, usage of a resource for the database exceeds a threshold, and a threshold exceeds availability of a resource for the database.

29. The non-transitory computer-readable media of claim 25 wherein the request that indicates the database configuration details specifies an amount of processor cores.

30. The non-transitory computer-readable media of claim 25 wherein generating the first rule to generate the request that indicates the database configuration details comprises executing a nearest neighbor algorithm.

31. The non-transitory computer-readable media of claim 25 wherein:
the asynchronous job causes cloning the pluggable database into a second container database on a second computer, and
the request that indicates the database configuration details does not identify: the second computer nor the second container database.

32. The non-transitory computer-readable media of claim 25 wherein:
each past event of the first plurality of past events comprises one or more attributes;
training the machine learning engine comprises, for each attribute of the one or more attributes, adjusting a weight associated with the attribute.

33. The non-transitory computer-readable media of claim 25 wherein said first rule to generate the request that indicates the database configuration details is automatically generated based on a particular database tenant.

34. The non-transitory computer-readable media of claim 25 wherein the instructions, when executed by the one or more processors, further cause:
the rules engine loading the first plurality of database rules and a plurality of manually crafted rules;
the rules engine loading a subset of the second plurality of database rules, wherein each particular rule of the subset of the second plurality of database rules replaces a corresponding rule selected from the group consisting of:
the plurality of manually crafted rules when the confidence score exceeds a second threshold, and
the first plurality of database rules when the confidence score does not exceed the second threshold.

35. The non-transitory computer-readable media of claim 25 wherein the database configuration details specify tuning the database for faster query execution.

36. The non-transitory computer-readable media of claim 35 wherein the database configuration details specify adjusting at least one amount selected from the group consisting of:
a maximum count of open database cursors, a maximum count of connection sessions, a maximum size of a memory store of session-dependent variables, and a maximum size of a memory store of session-independent variables.

37. The non-transitory computer-readable media of claim 26 wherein the instructions, when executed by the one or more processors, further cause:
calculating a selectivity of a query predicate based on the one or more statistics;
calculating, based on the selectivity, a respective estimated cost for each query mechanism of a plurality of alternate query mechanisms.

38. The non-transitory computer-readable media of claim 37 wherein:
the respective estimated cost of a query mechanism is based on an estimated amount of at least one resource selected from the group consisting of: memory, and input/output (I/O);
the query mechanism comprises at least one mechanism selected from the group consisting of: a) a particular access method of a plurality of alternate access methods that include table scanning and index traversal, and b) a particular join ordering of a plurality of alternate join orderings.

39. The non-transitory computer-readable media of claim 26 wherein the instructions, when executed by the one or more processors, further cause performing, based on the one or more statistics, at least one activity selected from the group consisting of:
inserting an optimizer hint into a query based on the one or more statistics,
creating or dropping a database index,
encoding or unencoding a column,
defragmenting or preloading a column or table,
materializing or dematerializing an object of a database view,
resizing a database file or a tablespace, and
copying the one or more statistics from a data dictionary of the database to a data dictionary of a second database.

40. The non-transitory computer-readable media of claim 25 wherein the asynchronous job configuring the database comprises:
the asynchronous job detecting whether a cause of the event has ceased;
the asynchronous job configuring the database only if the cause has not ceased.

41. The non-transitory computer-readable media of claim 25 wherein the database is a pluggable database capable of being stored within a container database.

42. The non-transitory computer-readable media of claim 41 wherein:
the first plurality of database rules includes a fourth rule that is applicable to a second pluggable database that is stored within a same container database that the pluggable database is stored in;

the event identifies the pluggable database and indicates a cause;

the first rule to generate the request that indicates the database configuration details contains a first action template and a first condition template that matches the cause;

the fourth rule contains a second action template and a second condition template that matches the cause;

the instructions, when executed by the one or more processors, further cause:

receiving a second event from the particular DBMS that identifies the second pluggable database and indicates the cause;

applying the second action template based on detecting:
the event and the second event include the cause,
the asynchronous job has finished configuring the pluggable database, and
the cause has not ceased.

43. The non-transitory computer-readable media of claim 41 wherein the asynchronous job causes resizing of a fast recovery area.

44. The non-transitory computer-readable media of claim 25 wherein the first rule to generate the request that indicates the database configuration details specifies, based on a temporal period, adjusting an allocated amount of at least one resource.

45. The non-transitory computer-readable media of claim 25 wherein executing the first rule to generate the request that indicates the database configuration details comprises generating a second event that causes a fourth rule to execute.

46. The non-transitory computer-readable media of claim 25 wherein the event indicates at least one execution statistic selected from the group consisting of: an execution statistic of different queries, an execution statistic of data manipulation language (DML) writes, an execution statistic of data definition language (DDL) commands, and an execution statistic of a particular query.

47. The non-transitory computer-readable media of claim 46 wherein the instructions, when executed by the one or more processors, further cause, after the asynchronous job configures the database, the asynchronous job initiates a database health check that generates a second event that indicates at least one selected from the group consisting of: an execution statistic of different queries, an execution statistic of DML writes, an execution statistic of DDL commands, an execution statistic of a particular query, a result of an integrity check of the database, usage of a resource for the database exceeds a threshold, and a threshold exceeds availability of a resource for the database.

48. The non-transitory computer-readable media of claim 25 wherein the request comprises a representational state transfer (REST) request.

* * * * *